(12) United States Patent
Machida et al.

(10) Patent No.: US 6,967,762 B2
(45) Date of Patent: Nov. 22, 2005

(54) IMAGE DISPLAY MEDIUM, IMAGE DISPLAY, DEVICE AND IMAGE DISPLAY METHOD

(75) Inventors: Yoshinori Machida, Ashigarakami-gun (JP); Yasufumi Suwabe, Ashigarakami-gun (JP); Yoshiro Yamaguchi, Ashigarakami-gun (JP); Motohiko Sakamaki, Ashigarakami-gun (JP); Takeshi Matsunaga, Ashigarakami-gun (JP); Kiyoshi Shigehiro, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/733,404

(22) Filed: Dec. 12, 2003

(65) Prior Publication Data

US 2004/0252361 A1    Dec. 16, 2004

(30) Foreign Application Priority Data

Jun. 12, 2003   (JP) ............................ 2003-167690

(51) Int. Cl.$^7$ ............................................. G02B 26/00
(52) U.S. Cl. .................... 359/296; 359/292; 359/290; 359/291; 359/252; 359/254
(58) Field of Search ................ 359/296, 290, 359/291, 292, 295, 298, 252, 253, 254

(56) References Cited

U.S. PATENT DOCUMENTS

| | | | |
|---|---|---|---|
| 4,536,428 A | * 8/1985 | Murata et al. | 428/117 |
| 2002/0075513 A1 | * 6/2002 | Yogome et al. | 358/1.15 |
| 2002/0113871 A1 | * 8/2002 | Sakamaki et al. | 348/106 |
| 2003/0030884 A1 | * 2/2003 | Minami | 359/296 |
| 2003/0227665 A1 | * 12/2003 | Kawai | 359/296 |
| 2004/0216836 A1 | * 11/2004 | Ukigaya | 156/278 |

FOREIGN PATENT DOCUMENTS

| | | |
|---|---|---|
| JP | A 9-185087 | 7/1997 |
| JP | A 11-202804 | 7/1999 |
| JP | A 2000-347483 | 12/2000 |
| JP | A 2003-107532 | 4/2003 |

* cited by examiner

Primary Examiner—Ricky L. Mack
Assistant Examiner—Brandi Thomas
(74) Attorney, Agent, or Firm—Oliff & Berridge, PLC

(57) ABSTRACT

A plurality of cells are set apart by a spacer member between a display plate and a rear face plate. Black particles with positive static charge and white particles with negative static charge are dispersed in a dispersion fluid, which is enclosed in the cells. A red colored layer and electrodes 7a, 7b and 7c are formed at the rear face plate. When a voltage of +50 V is applied to the electrode 7a, 0 V to 7b and −50 V to 7c, the black particles move to the electrode 7c, the white particles move to the electrode 7a, and red can be viewed. When a voltage of +50 V is applied to the electrode 7a, 0 V to 7b and +50 V to 7c, the white particles move to the electrode 7a, the black particles move to the electrode 7b, and black can be viewed. When a voltage of −50 V is applied to the electrode 7a, 0 V to 7b and −50 V to 7c, the black particles move to the electrode 7c, the white particles move to the electrode 7b, and white can be viewed.

16 Claims, 22 Drawing Sheets

IMAGE DISPLAY MEDIUM, IMAGE DISPLAY, DEVICE AND IMAGE DISPLAY METHOD

CROSS-REFERENCE TO RELATED APPLICATION

This application claims priority under 35USC 119 from Japanese Patent Application No. 2003-167690, the disclosure of which is incorporated by reference herein.

BACKGROUND OF THE INVENTION

1. Field of the Invention

The present invention relates to an image display medium, an image display device and an image display method, and particularly to an image display medium capable of implementing repeatedly rewritable display by moving colored particles with an electric field, to an image display device equipped with the image display medium and to an image display method therefor.

2. Description of the Related Art

Heretofore, methods have been proposed in which a dispersion fluid in which colored particles are dispersed is enclosed between a transparent display plate and a rear face plate, the colored particles are arbitrarily moved by forming electric fields between the plates in accordance with image information, and color of the colored particles, color of the dispersion fluid and/or color of a colored rear face plate is displayed.

For example, Japanese Patent Application Laid-Open (JP-A) No. 9-185087 discloses a structure in which, as shown in FIG. 40A, a dispersion in which black particles 4 are dispersed in a white dispersion fluid L is employed, the black particles 4 are adhered to a transparent display plate 1 side, to implement black display, by an electric field which is formed between the plates by a voltage applied between an electrode 7a and an electrode 7b. Conversely, as shown in FIG. 40B, white display is implemented by moving and adhering the black particles 4 to a rear face plate 2 side.

Further, JP-A No. 2003-107532 discloses a structure which, as shown in FIGS. 41A and 41B, employs a dispersion in which white particles 5 and the black particles 4, which have different electrostatic polarities, are dispersed in a transparent dispersion fluid L, and the white particles 5 and black particles 4 are selectively adhered to the display plate 1 side to implement display by an electric field formed between the plates by a voltage applied between the electrodes 7a and 7b.

Further still, JP-A No. 11-202804 discloses a structure in which, as shown in FIG. 42A, a dispersion in which the black particles 4 are dispersed in a transparent dispersion fluid L is employed, and a colored layer 6 on the rear face plate 2 is colored white. Hence, white display is implemented by removing the black particles 4 from above the colored layer 6 by an electric field which is formed by a voltage applied between the electrodes 7a and 7b and, as shown in FIG. 42B, black display is implemented by adhering the black particles 4 to the colored layer 6.

These image display mediums, being reflection-type image display mediums, are capable of providing high whiteness and black-white contrast, and have been anticipated as image display mediums that implement displays comparable to paper.

However, in these systems, only two colors can be displayed at a single display element, and consequently multi-color display cannot be implemented by the basic forms.

Accordingly, methods of forming color filters at a display surface for multi-colorization, methods which employ chromatic particles, methods in which the rear face plate is colorized, and the like have been investigated (see, e.g., JP-A No. 2000-347483).

A method which employs color filters displays an arbitrary color by mixing a color of particles adhered to an inner face of the display plate with the color filter formed at the display plate. For example, if the image display medium employs white particles and black particles, the color of the color filter is displayed when the white particles are adhered to the display plate, and black display is implemented when the black particles are adhered thereat. Here, it is possible to employ an RGB filter as the color filter, control the reflection of red, green and blue light by moving the white particles and black particles in accordance with image information, and hence display arbitrary colors.

However, if a color filter is disposed at the display plate, there is a problem in that whiteness, which is a particular feature of these image display mediums, is lost and backgrounds of displayed images are darkened.

Further, with a method which employs chromatic particles, for example, red, green and blue particles or a combination of dispersion fluids of each color with black particles are enclosed in cells with a regular arrangement, and one pixel is formed by three neighboring cells.

However, although black display by the black particles is excellent, white display is implemented by combining the colors of the colored particles. Therefore, there is a problem in that display density is higher, and whiteness is lost.

Furthermore, with a combination of red, green and blue particles with white particles, white display by the white particles is excellent, but black display is implemented by combining the colors of the chromatic particles. Consequently, there is a problem in that display density is reduced.

Further again, with a method in which the rear face plate is colorized, respective cells at the rear face plate are colored, for example, red, green and blue, and these are combined with white particles or black particles. As above, three neighboring cells form one pixel. In this method, similarly to the method which employs chromatic particles, there is a problem in that either white display or black display is not achieved with an appropriate density.

As described above, because, in essence, only two colors can be displayed at a single display element in the above-described conventional techniques, there is a problem in that display quality for either white display or black display deteriorates when multi-color display is implemented.

SUMMARY OF THE INVENTION

The present invention has been devised in order to solve the problem described above, and an object of the present invention is to provide—with an image display technology in which a dispersion fluid in which colored particles are dispersed is enclosed between a transparent display plate and a rear face plate, the colored particles are arbitrarily moved by the formation of electric fields between the plates in accordance with image information, and color of the colored particles, color of the dispersion fluid and/or color of a colored rear face plate is displayed—an image display medium, image display device and image display method capable of displaying colors that are to be displayed with appropriate densities, particularly densities of white display and black display, and capable of realizing multi-color display.

In order to achieve the object described above, according to a first aspect of the present invention, an image display medium is provided which includes: a display plate including light transmissivity; a colored rear face plate which is disposed to oppose the display plate; a substantially transparent dispersion fluid which is disposed between the plates; and at least two kinds of colored particles, which are contained in the dispersion fluid, can move in accordance with an electric field formed between the plates, and include different electrostatic characteristics and optical characteristics from one another.

According to a second aspect of the present invention, an image display medium is provided which includes: a display plate including light transmissivity; a rear face plate which is disposed to oppose the display plate an intermediate plate including light transmissivity, which is disposed between the display plate and the rear face plate; a first dispersion fluid disposed between the display plate and the intermediate plate; a second dispersion fluid disposed between the intermediate plate and the rear face plate; at least two kinds of colored particles, which are contained in the first dispersion fluid, can move in accordance with an electric field, and include different electrostatic characteristics and optical characteristics from one another; and at least two other kinds of colored particles, which are contained in the second dispersion fluid, can move in accordance with an electric field, include different electrostatic characteristics and optical characteristics from one another, and differ from the colored particles in the first dispersion fluid.

According to a third aspect of the present invention, An image display medium is provided which includes: a display plate including light transmissivity; a rear face plate which is disposed to oppose the display plate; a colored dispersion fluid which is disposed between the plates; and at least two kinds of colored particles, which are contained in the dispersion fluid, can move in accordance with an electric field formed between the plates, and include different electrostatic characteristics and optical characteristics from one another.

According to a fourth aspect of the present invention, an image display device is provided which includes (a) an image display medium including: a display plate including light transmissivity; a colored rear face plate which is disposed to oppose the display plate; a substantially transparent dispersion fluid which is disposed between the plates; at least two kinds of colored particles, which are contained in the dispersion fluid, can move in accordance with an electric field formed between the plates, and include different electrostatic characteristics and optical characteristics from one another; and a plurality of electrodes for forming the electric field, which are disposed at at least one of the display plate and the rear face plate, and (b) a voltage application apparatus which applies voltages to the electrodes in accordance with image information.

According to a fifth aspect of the present invention, an image display device is provided which includes (a) an image display medium including: a display plate including light transmissivity; a colored rear face plate which is disposed to oppose the display plate; a substantially transparent dispersion fluid which is disposed between the plates; and at least two kinds of colored particles, which are contained in the dispersion fluid, can move in accordance with an electric field formed between the plates, and include different electrostatic characteristics and optical characteristics from one another, (b) a plurality of electrodes for forming the electric field, which are disposed at at least one of the display plate and the rear face plate, and (c) a voltage application apparatus which applies voltages to the electrodes in accordance with image information.

According to a sixth aspect of the present invention, an image display method for an image display medium is provided. The image display medium includes: a display plate including light transmissivity; a colored rear face plate which is disposed to oppose the display plate; a substantially transparent dispersion fluid which is disposed between the plates; and at least two kinds of colored particles, which are contained in the dispersion fluid, can move in accordance with an electric field formed between the plates, and include different electrostatic characteristics and optical characteristics from one another. The image display method includes the steps of: of the colored particles, adhering a selected one kind of the colored particles all across at least one of the display plate and the rear face plate, and clustering the other colored particles at a location at which the other colored particles substantially do not hinder image display; and clustering all of the colored particles at locations at which the colored particles substantially do not hinder image display.

According to a seventh aspect of the present invention, an image display method for an image display medium is provided. The image display medium includes: a display plate including light transmissivity; a colored rear face plate which is disposed to oppose the display plate; at least two kinds of colored particles, which can move between the plates in accordance with an electric field formed between the plates and which include different electrostatic characteristics and optical characteristics from one another; a plurality of cells formed between the plates, a dispersion fluid containing the colored particles being enclosed in the cells in predetermined amounts; and a plurality of electrodes for forming the electric field, which are disposed at at least one of the display plate and the rear face plate, each of the cells having at least three of the electrodes exclusively allocated thereto, and D.C. voltages being applicable to the at least three electrodes mutually independently. The image display method includes the steps of: of the colored particles in at least one of the cells, adhering a selected one kind of the colored particles all across at least one of the display plate and the rear face plate, and clustering the other colored particles at a location at which the other colored particles substantially do not hinder image display; and clustering all of the colored particles in the at least one cell at locations at which the colored particles substantially do not hinder image display.

DETAILED DESCRIPTION OF THE INVENTION

Below, details of a plurality of embodiments of the present invention will be described with reference to the drawings.

[First Embodiment]

Figure 1:
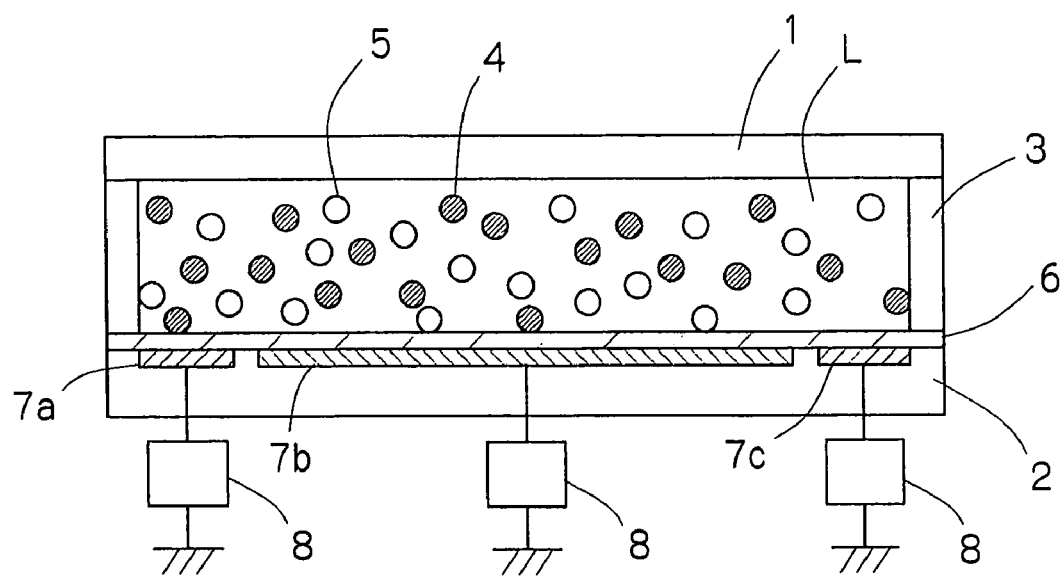
FIG. 1 is an explanatory view showing schematic structure of an image display medium of a first embodiment of the present invention, which shows a structure in which a plurality of electrodes are formed at the rear face plate 2.

A first embodiment will be described with reference to FIGS. 1 to 6. In an image display medium relating to the present embodiment, the transparent display plate 1 and the rear face plate 2, which faces the display plate 1, are arranged. The spacer member 3 is disposed between the display plate 1 and the rear face plate 2. Thus, the spacer member 3 maintains an inter-plate separation, and at the same time sets apart a plurality of cells between the plates. Note that, for the sake of explanation and simplification of the drawings, FIG. 1 is a drawing focusing on and showing only one cell.

In a cell formed between the plates, a dispersion fluid L having transparency, the black particles 4, which are positively charged, and the white particles 5, which are negatively charged, are enclosed. These are electrophoresed between the plates by electric fields formed between the plates.

The colored layer 6, which is colored a desired color (for example, red), is formed at a surface of the display plate 1 side of the rear face plate 2. The plurality of the electrodes 7a, 7b and 7c are formed beneath the colored layer 6. The electrodes 7a, 7b and 7c are respectively connected with voltage application components 8, and desired voltages are applied in accordance with image information.

In the present embodiment, a glass plate with a thickness of 1.1 mm is employed as the transparent display plate 1. The rear face plate 2 employs a glass plate at which an ITO electrode film is formed, and a desired electrode pattern is formed by photo-etching. The red colored layer 6 is formed by printing at the surface of the rear face plate 2. The spacer member 3 employs a dry photoresist film with a thickness of 50 $\mu$m, and is formed in a desired pattern. In the present embodiment, the cells are patterned so as to have longitudinal and lateral pitches of 300 $\mu$m. Widths of the electrodes 7a and 7c formed on the rear face plate 2 are 30 $\mu$m, and a width of the electrode 7b is 200 $\mu$m. The black particles 4 and white particles 5 employ colorant particles with diameters from 2 $\mu$m to 3 $\mu$m.

In the present embodiment, the black particles 4 may employ black colorant particles such as carbon black, manganese ferrite black, titanium black or the like. The white particles 5 may employ white colorant particles such as titanium oxide, zinc oxide, tin oxide or the like. Further, the particles may be covered with known charge-regulation materials to stabilize electrostatic characteristics thereof.

A highly insulative colorless transparent liquid can be selected as a dispersion medium having light transmissivity. For example, a hydrocarbon-based solvent such as isoparaffin, silicone, toluene, xylene, normal paraffin or the like may be employed.

Next, an image display method of the image display medium relating to the present embodiment will be described.

Figure 2:
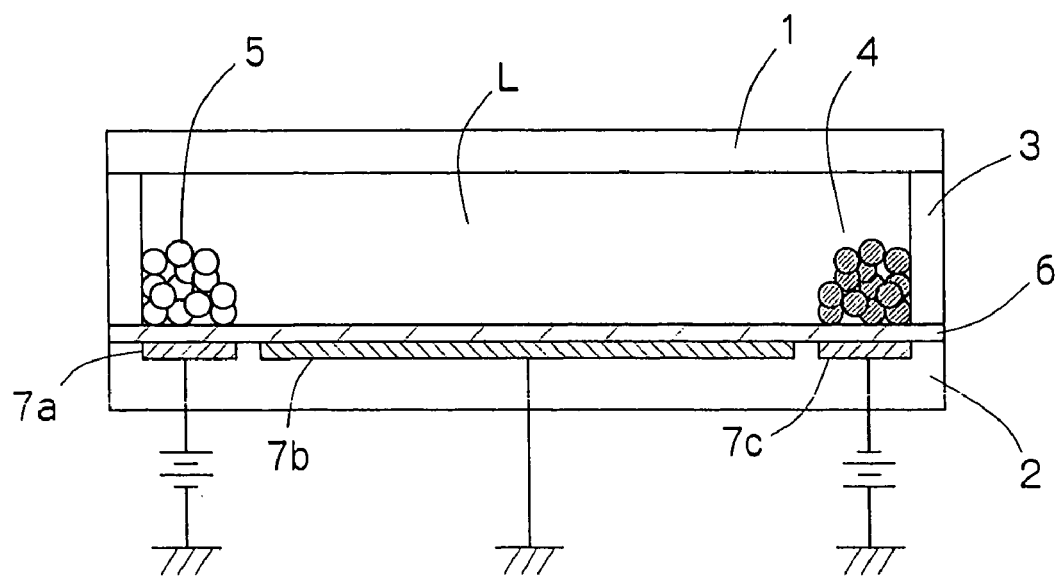
FIG. 2 is a view showing, in the image display medium shown in FIG. 1, a state which can display color of the colored layer 6, which is formed at the rear face plate 2, when a voltage of +50 V is applied to the electrode 7a of the rear face plate 2, 0 V is applied to the electrode 7b and −50 V is applied to an electrode 7c.

As shown in FIG. 2, if a voltage of +50 V is applied to the electrode 7a of the rear face plate 2, 0 V is applied to the electrode 7b and −50 V is applied to the electrode 7c, the positively charged black particles 4 will be moved and adhered onto the electrode 7c by electrophoresis and the negatively charged white particles 5 will be moved and adhered onto the electrode 7a. As a result, the red colored layer 6 formed at the rear face plate 2 can be observed from the display plate 1 side, and red display is implemented.

Figure 3:
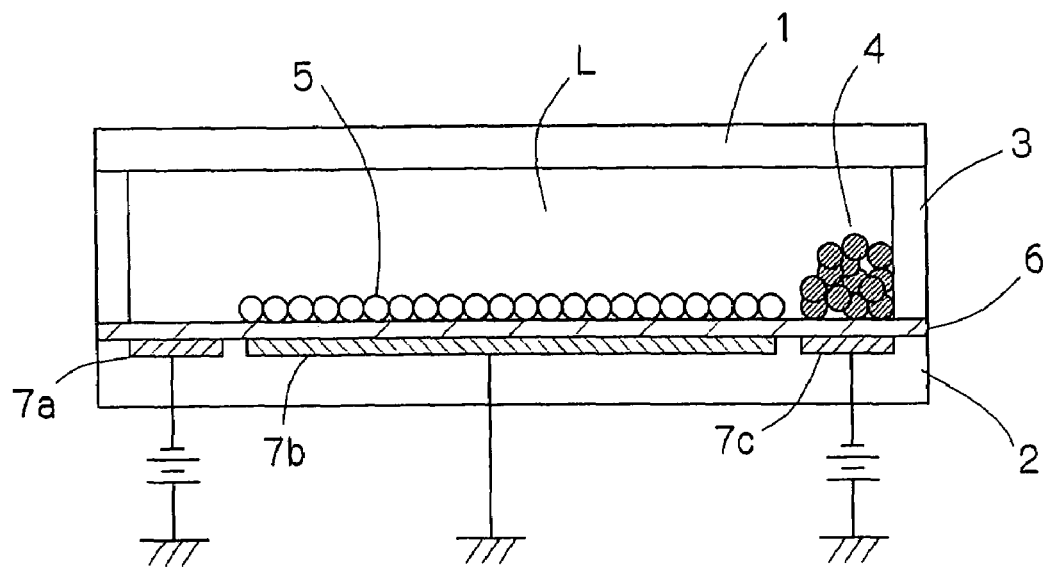
FIG. 3 is a view showing, in the image display medium shown in FIG. 1, a state which can display white, when a voltage of −50 V is applied to the electrode 7a of the rear face plate 2, 0 V is applied to the electrode 7b and −50 V is applied to the electrode 7c.

From this state, as shown in FIG. 3, if a voltage of −50 V is applied to the electrode 7a of the rear face plate 2, 0 V is applied to the electrode 7b and −50 V is applied to the electrode 7c, the white particles 5 that have been adheringly held on the electrode 7a will be moved onto the electrode 7b. After this, the white particles 5 which are adheringly held on the electrode 7b of the rear face plate 2 can be observed from the display plate 1 side. Thus, white display is implemented. If the voltage that is applied to the electrode 7c of the rear face plate 2 at this time is lower (for example, −60 V) than the voltage applied to the electrode 7a, the black particles 4 that are adheringly held on the electrode 7c can be more assuredly retained, and this is preferable.

Figure 4:
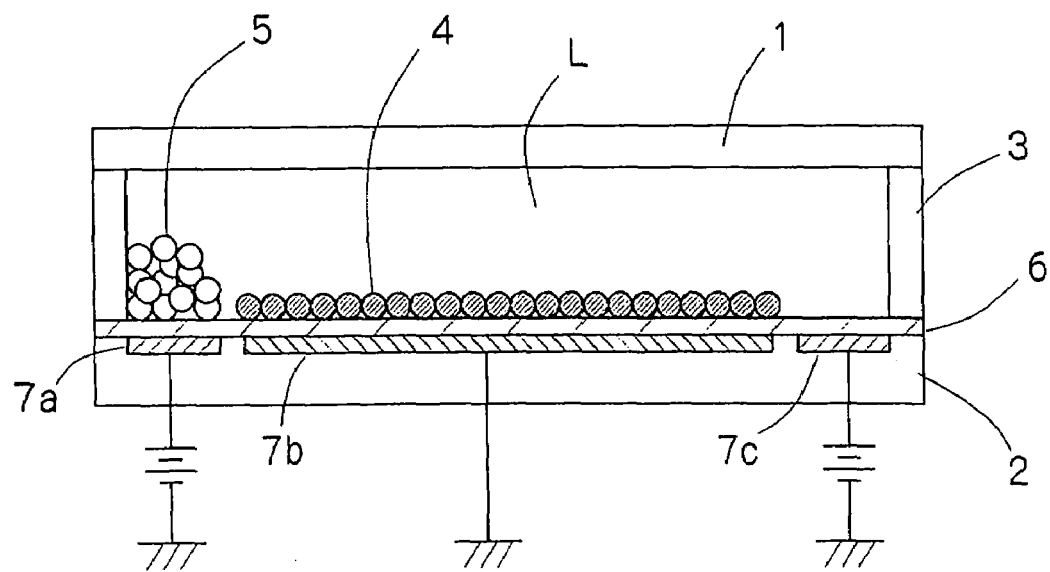
FIG. 4 is a view showing, in the image display medium shown in FIG. 1, a state which can display black, when a voltage of +50 V is applied to the electrode 7a of the rear face plate 2, 0 V is applied to the electrode 7b and +50 V is applied to the electrode 7c.

Further, from this state, as shown in FIG. 4, if a voltage of +50 V is applied to the electrode 7a of the rear face plate 2, 0 V is applied to the electrode 7b and +50 V is applied to the electrode 7c, the white particles 5 that have been adheringly held on the electrode 7b will be moved onto the electrode 7a, and the black particles 4 which have been adheringly held on the electrode 7c will be moved to the electrode 7b. As a result, after this, the black particles 4 which are adheringly held on the electrode 7b of the rear face plate 2 can be observed from the display plate 1 side. Thus, black display is implemented. If the voltage that is applied to the electrode 7a of the rear face plate 2 at this time is higher (for example, +60 V) than the voltage applied to the electrode 7c, the white particles 5 that are adheringly held on the electrode 7a can be more assuredly retained, and this is preferable.

It is also possible to temporarily return from the white display state shown in FIG. 3 to the red display state shown in FIG. 2 and then proceed to the black display state shown in FIG. 4.

Figure 5:
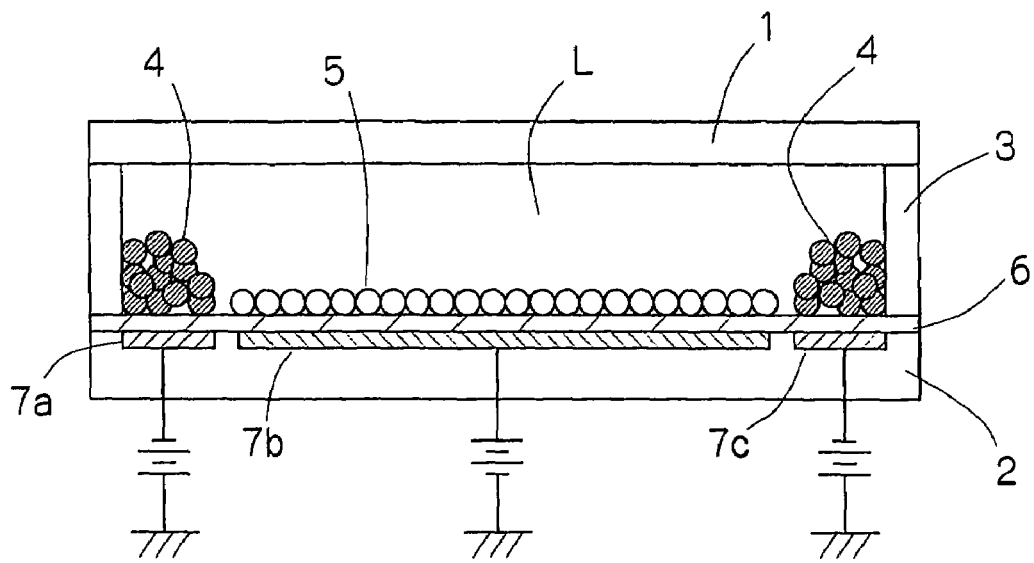
FIG. 5 is a view showing a state which can display white by a different voltage application state from the voltage application state shown in FIG. 3.

As another image display method, from a non-display (gray) state shown in FIG. 1, if voltages of −50 V are applied to the electrodes 7a and 7c of the rear face plate 2 and +50 V is applied to the electrode 7b, as shown in FIG. 5, the positively charged black particles 4 will be moved and adhered onto the electrodes 7a and 7c by electrophoresis and the negatively charged white particles 5 will be moved and adhered onto the electrode 7b. In this state, the white particles 5, which are adheringly held on the electrode 7b of the rear face plate 2 can be observed from the display plate 1 side. Thus, white display is implemented.

Figure 6:
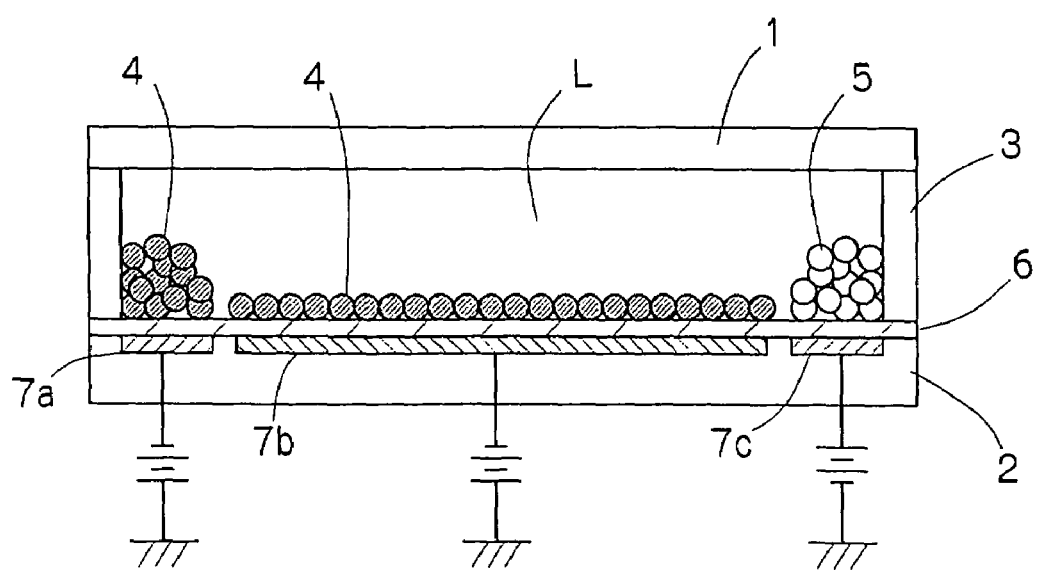
FIG. 6 is a view showing a state which can display black by a different voltage application state from the voltage application state shown in FIG. 4.

Then, as shown in FIG. 6, if voltages of −50 V are applied to the electrodes 7a and 7b of the rear face plate 2 and +50 V is applied to the electrode 7c, the white particles 5 which have been adheringly held on the electrode 7b and the black particles 4 which have been adheringly held on the electrode 7c will exchange respective places. As a result, after this, the black particles 4 which are adheringly held on the electrode 7b of the rear face plate 2 can be observed from the display plate 1 side. Thus, black display is implemented.

Further, from this state, if a voltage of 0 V is applied to the electrode 7b of the rear face plate 2, the black particles 4 that have been adheringly held on the electrode 7b will be electrophoresed to the electrode 7a, and the colored layer 6 of the rear face plate 2 can be observed. Thus, red display is implemented.

Thus, according to the present embodiment, display of three colors can be implemented at a single display element, and multi-color display can be implemented without reducing black-and-white display quality. Further, the particles can be selectively moved to desired locations simply by the application of D.C. voltages.

For the present embodiment, an image display medium in which an inter-plate space is divided into a plurality of cells has been described, but it is not necessarily the case that the cells need to be set apart. However, because there is a risk of occurrences of uneven distribution of the particles in a display area due to intra-face movement in accordance with repeated display of the colored particles, and due to sinkage due to gravity and the like, a cell structure is preferable in regard to long-term stability of display.

[Second Embodiment]

Figure 7:
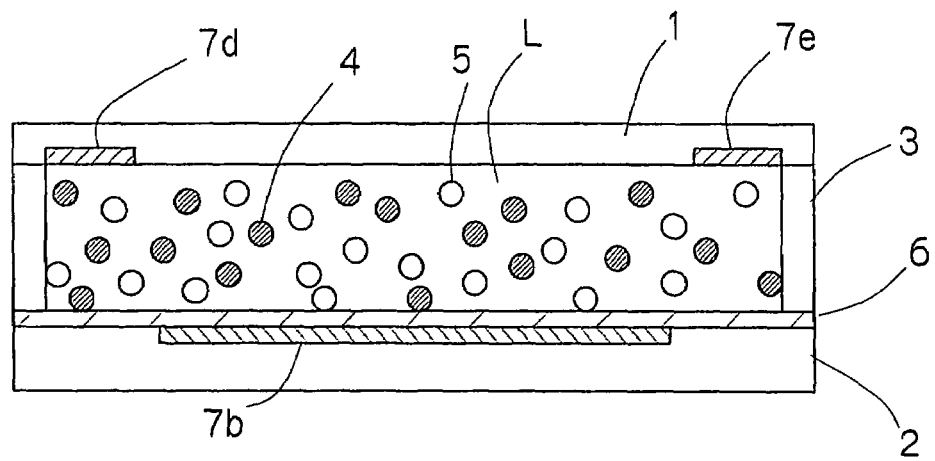
FIG. 7 is an explanatory view showing schematic structure of an image display medium of a second embodiment of the present invention, which shows a structure in which electrodes are formed at the display plate 1 and the rear face plate 2.

Next, a second embodiment of the present invention will be described with reference to FIGS. 7 to 9, and (a plurality of) variant examples will be described with reference to FIGS. 10 to 15. Note that components that are the same as in the first embodiment are assigned the same reference numerals, and detailed descriptions thereof are omitted.

In an image display medium relating to the present embodiment, glass plates at which ITO electrode layers are formed are employed for both the transparent display plate 1 and the rear face plate 2, and desired electrode patterns are formed by photo-etching. Specifically, the electrodes 7a and 7c of the rear face plate 2 illustrated in FIG. 1 are formed as electrodes 7d and 7e at the display plate 1 side. Other structures are the same as the structures illustrated in FIG. 1 (see FIG. 7).

Figure 8:
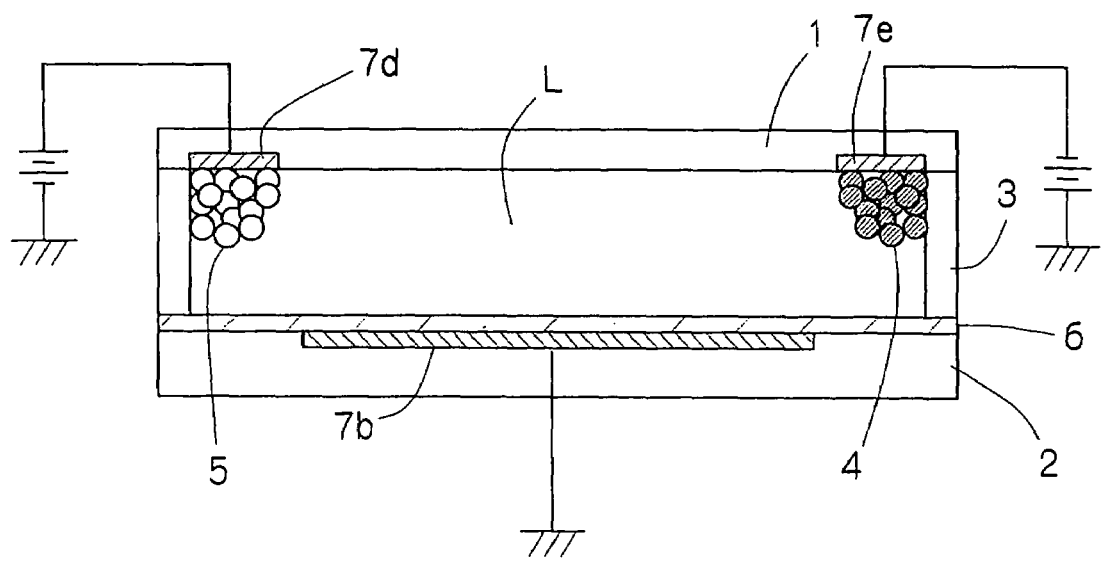
FIG. 8 is a view showing, in the image display medium shown in FIG. 7, a state which can display color of the colored layer 6 formed at the rear face plate 2.

In this structure, as shown in FIG. 8, if a voltage of +50 V is applied to the electrode 7d formed at the display plate 1, −50 V is applied to the electrode 7e and 0 V is applied to the electrode 7b formed at the rear face plate 2, the positively charged black particles 4 will be electrophoresed onto the electrode 7e and the negatively charged white particles 5 will be electrophoresed onto the electrode 7d. Thus, the red colored layer 6 formed at the rear face plate 2 can be observed from the display plate 1 side, and red display is implemented.

Figure 9:
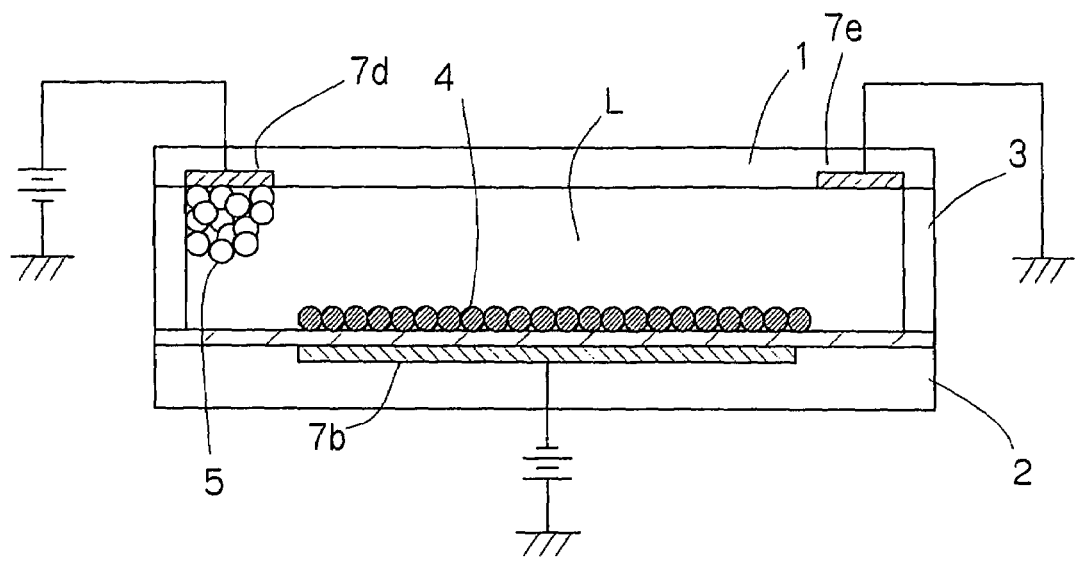
FIG. 9 is a view showing, in the image display medium shown in FIG. 7, a state which can display black.
Figure 10:
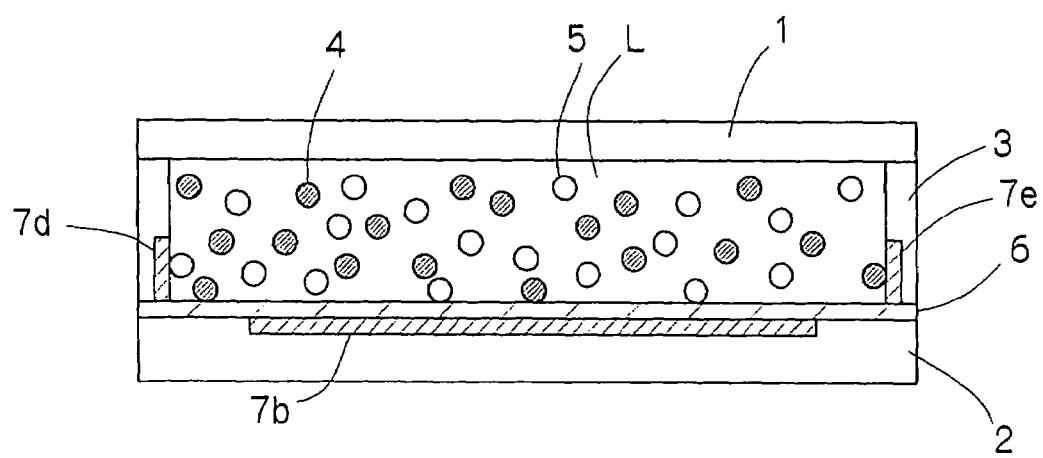
FIG. 10 is a view showing an example in which electrodes for forming electric fields to drive the colored particles are formed at a spacer member 3.

From this state, as shown in FIG. 9, if a voltage of +50 V is applied to the electrode 7d of the display plate 1, 0 V is applied to the electrode 7e and −50 V is applied to the electrode 7b of the rear face plate 2, the black particles 4 that have been adheringly held on the electrode 7e will be moved to the electrode 7b. After this, the black particles 4 which are adheringly held on the electrode 7b can be observed from the display plate 1 side. Thus, black display is implemented.

Further, although not shown in the drawings, in contrast to the state described above, white display can be implemented by the application of a voltage of −50 V to the electrode 7d of the display plate 1, 0 V to the electrode 7e and +50 V to the electrode 7b of the rear face plate 2.

Thus, the electrodes for forming electric fields and driving the colored particles may be formed at the display plate 1 rather than only at the rear face plate 2. Further, as illustrated by an example in FIG. 10, the electrodes 7d and 7e may be formed at the spacer member 3.

Figure 11:
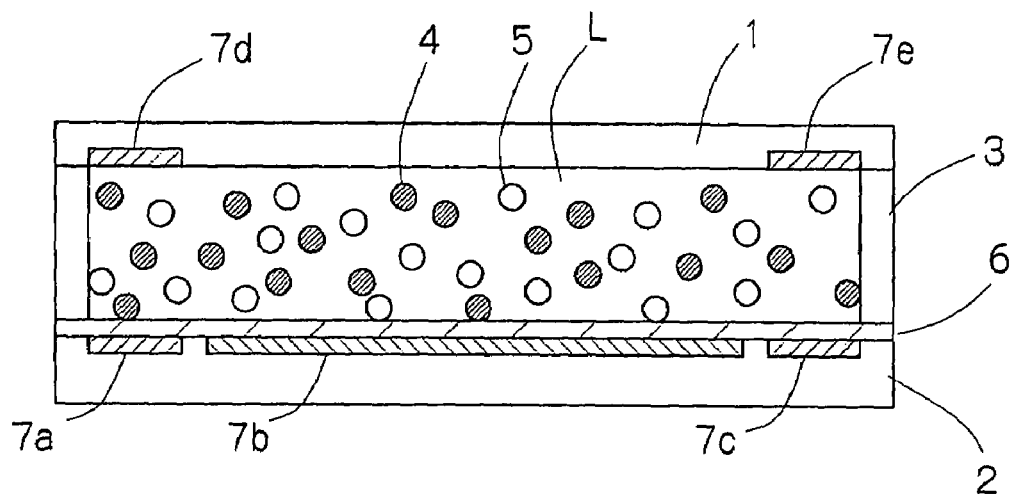
FIG. 11 is a view showing an example in which five electrodes capable of independently applying voltages are formed at the display plate 1 and the rear face plate 2 in a single cell.

Further, examples in which three electrodes are disposed in a single cell have been illustrated hitherto. However, it is possible to dispose a greater number of electrodes therein, as shown in FIG. 11. In this example, five electrodes 7a to 7e, which are capable of applying voltages independently, are formed at the display plate 1 and the rear face plate 2 in a single cell. In this example, although the electrode structure is more complex, finer electric fields for driving can be formed. Consequently, the movements of the colored particles can be more assuredly controlled.

Figure 12:
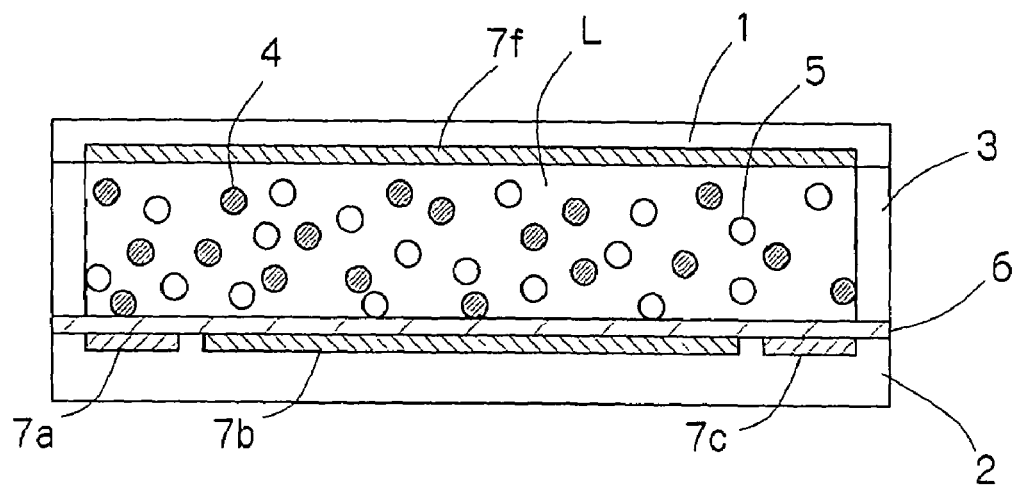
FIG. 12 is a view showing an example in which four electrodes capable of independently applying voltages are formed at the display plate 1 and the rear face plate 2 in a single cell.
Figure 13:
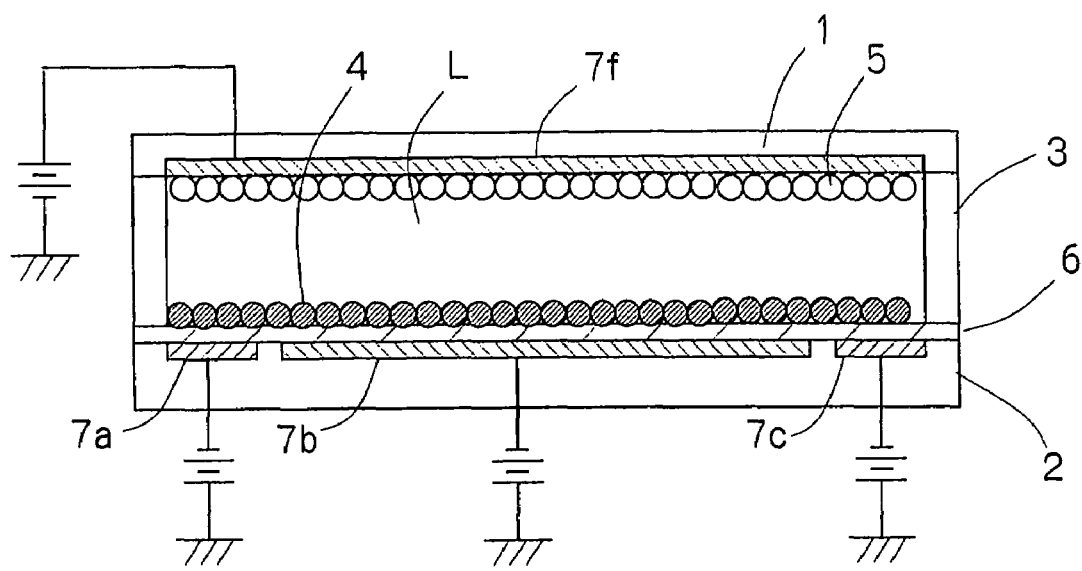
FIG. 13 is a view showing an example, at the structure of FIG. 12, in which the white particles 5 are adheringly held at the display plate 1 and white display is achieved.

Further still, in an example in FIG. 12, four electrodes 7a, 7b, 7c and 7f, which are capable of applying voltages independently, are disposed in a single cell, and the large electrodes 7f and 7b are formed to occupy large proportions of a display area at the display plate 1 and the rear face plate 2, respectively. In such an example, as shown in FIG. 13, if a voltage of +50 V is applied to the electrode 7f of the display plate 1 and −50 V is applied to the electrodes 7a, 7b and 7c of the rear face plate 2, the white particles 5 will be adheringly held at the display plate 1 and white display will be achieved.

Figure 14:
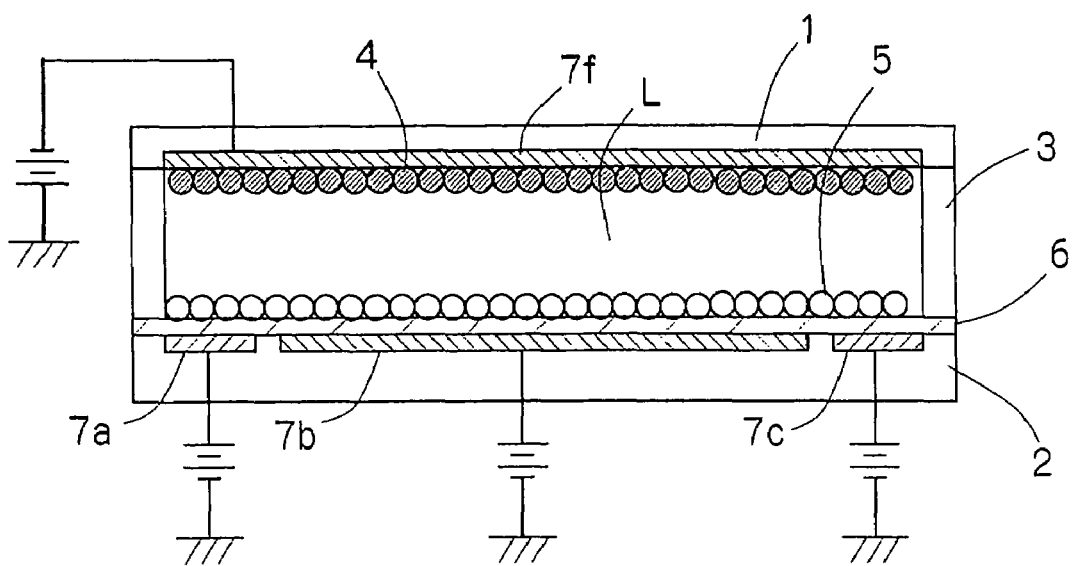
FIG. 14 is a view showing an example, at the structure of FIG. 12, in which the black particles 4 are adheringly held at the display plate 1 and black display is achieved.

Similarly, as shown in FIG. 14, if a voltage of −50 V is applied to the electrode 7f of the display plate 1 and +50 V is applied to the electrodes 7a, 7b and 7c of the rear face plate 2, the black particles 4 will be adheringly held at the display plate 1 and black display will be achieved. Thus, when the color of one of the colored particles is to be displayed, the display area is occupied by the one colored particles, without any need to cluster the other colored particles at a portion in the display area. Therefore, density of display colors by the colored particles can be raised.

Figure 15:
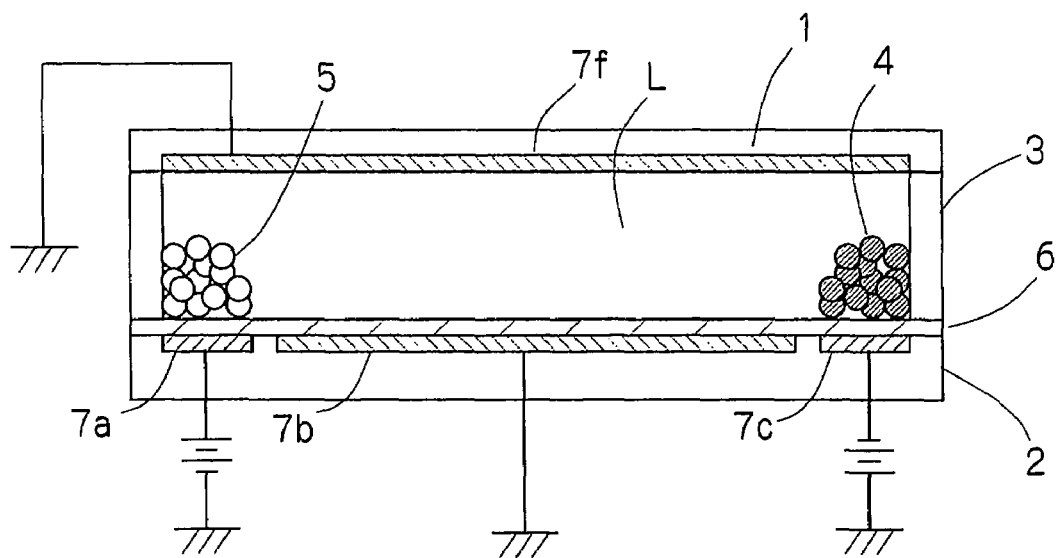
FIG. 15 is a view showing an example, at the structure of FIG. 12, in which color of the colored layer 6 formed at the rear face plate 2 is displayed.

Further, in this example, to display the color of the colored layer 6 which is formed at the rear face plate 2, it is possible to, for example, as displayed in FIG. 15, apply a voltage of 0 V to the electrode 7f of the display plate 1, +50 V to the electrode 7a of the rear face plate 2, 0 V to the electrode 7b and −50 V to the electrode 7c. Further, at such a time, the electrode 7f of the display plate 1 and the electrode 7b of the rear face plate 2 may be put into a floating state (an open state).

[Third Embodiment]

Figure 17:
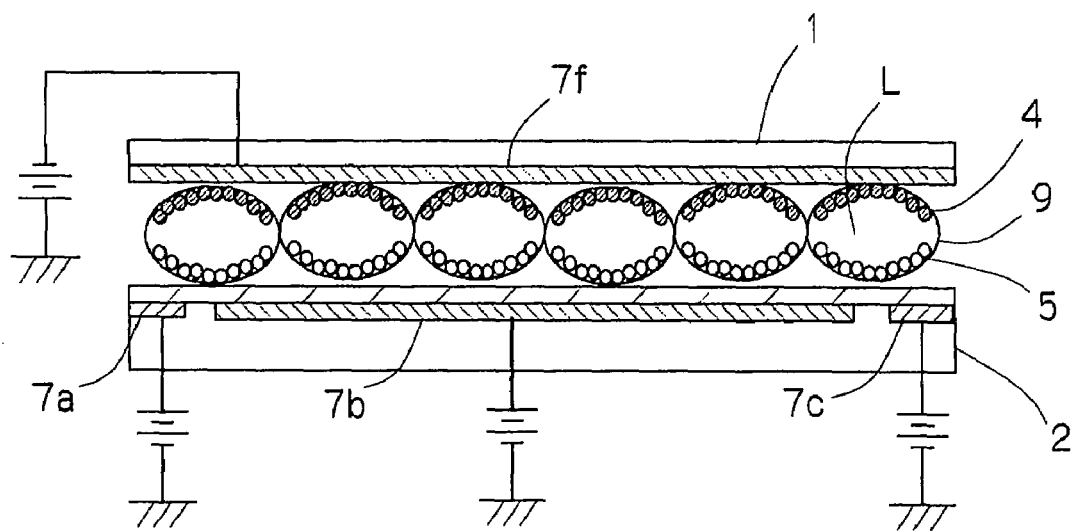
FIG. 17 is a view showing, in the structure of FIG. 16, a state which can display black.
Figure 18:
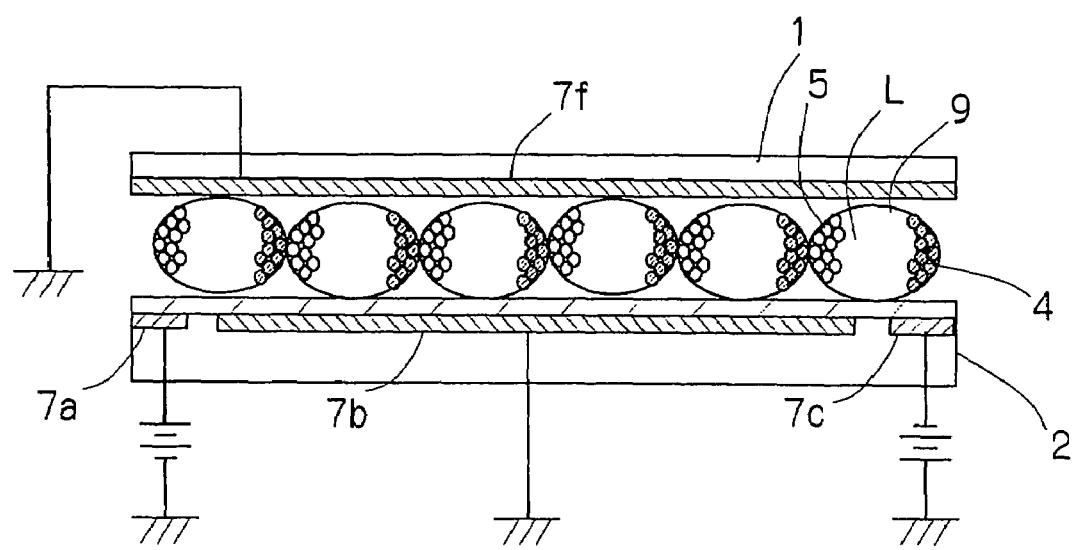
FIG. 18 is a view showing an example, in the structure of FIG. 16, in which color of the colored layer 6 formed at the rear face plate 2 is displayed.

Next, a third embodiment of the present invention will be described with reference to FIGS. 16 to 18, and a variant example will be described with reference to FIG. 19. Note that components that are the same as in the embodiments described above are assigned the same reference numerals, and detailed descriptions thereof are omitted.

Figure 16:
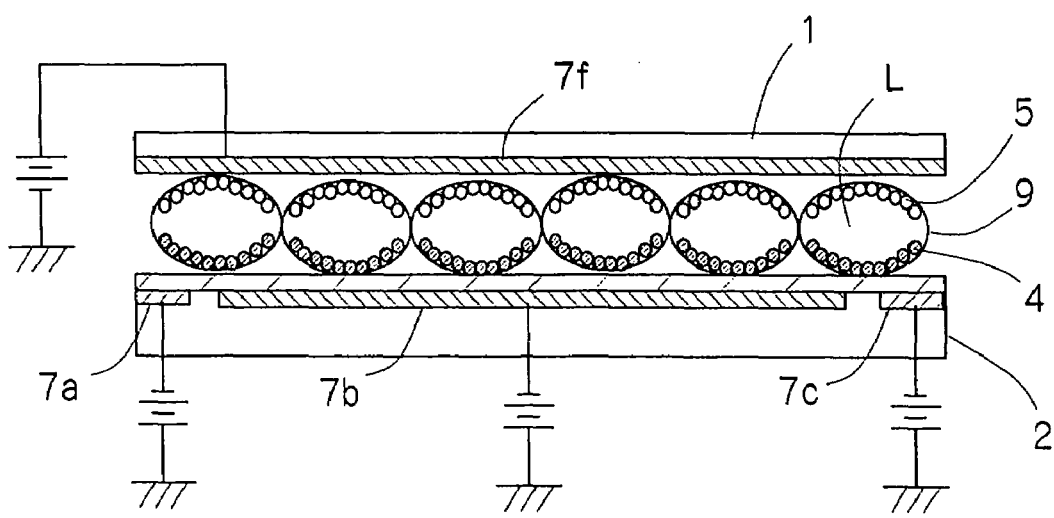
FIG. 16 is an explanatory view showing schematic structure of an image display medium of a third embodiment of the present invention, which shows a structure in which a plurality of transparent capsules 9 are disposed between the display plate 1 and the rear face plate 2.

In an image display medium shown in FIG. 16, a plurality of the transparent capsules 9 are enclosed between the display plate 1 and the rear face plate 2. The transparent dispersion fluid L, in which the positively charged black particles 4 and the negatively charged white particles 5 are dispersed, is enclosed in the capsules 9. Other structures are the same as the structures illustrated in FIG. 12. Note that, because the capsules 9 themselves function as spacer members for maintaining the inter-plate spacing, the spacer member 3 is omitted in the present embodiment.

The capsules 9 enclosing the dispersion fluid L may be formed by an interfacial polymerization method, a coacervation method, an in situ method or the like. Further, a material with high light transmissivity is preferable as a material of the capsules 9, and polyester, polyurethane, polyamide, polyethylene, polystyrene or the like may be employed.

As shown in FIG. 16, if a voltage of +50 V is applied to the electrode 7f of the display plate 1 and −50 V is applied to the electrodes 7a, 7b and 7c of the rear face plate 2, the white particles 5 will be adheringly held at the display plate 1 side, and white display will be achieved. Similarly, as shown in FIG. 17, if a voltage of −50 V is applied to the electrode 7f of the display plate 1 and +50 V is applied to the electrodes 7a, 7b and 7c of the rear face plate 2, the black particles 4 will be adheringly held at the display plate 1 side, and black display will be achieved. Furthermore, if, for example, a voltage of 0 V is applied to the electrode 7f of the display plate 1, +50 V is applied to the electrode 7a of the rear face plate 2, 0 V is applied to the electrode 7b and −50 V is applied to the electrode 7c, as shown in FIG. 18, the black particles 4 and white particles 5 in the capsules 9 will be arrayed at side walls of the capsules in accordance with the electric field. Thus, in this state, the color of the colored layer 6 formed at the rear face plate 2 can be displayed. At such a time, the electrode 7f of the display plate 1 and the electrode 7b of the rear face plate 2 may be put into a floating state.

Figure 19:
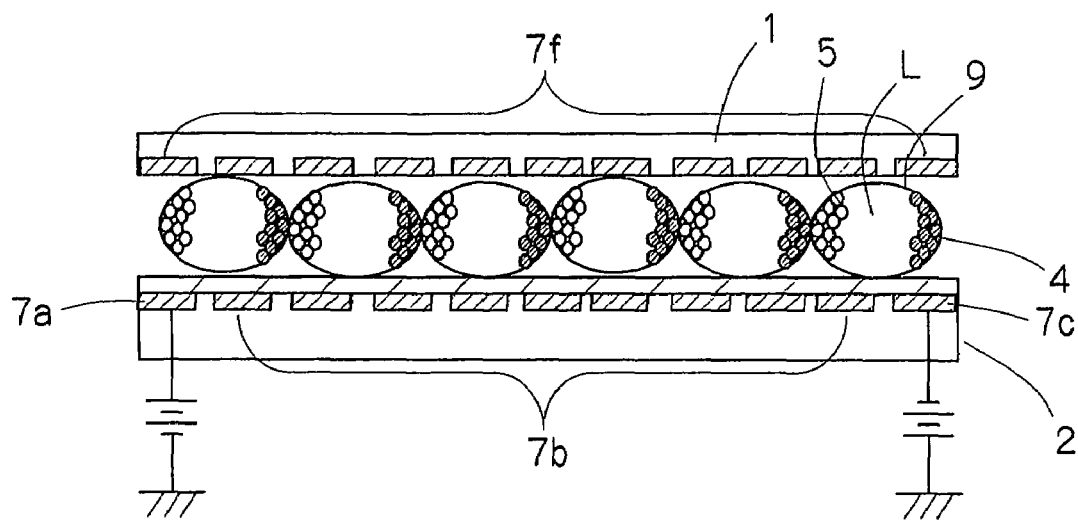
FIG. 19 is a view showing an example, in the structure of FIG. 16, in which electrodes of the display plate 1 and the rear face plate 2 are structured by pluralities of electrodes.

Further still, as shown in FIG. 19, the electrode 7f of the display plate 1 and the electrode 7b of the rear face plate 2 may be structured by pluralities of electrodes. In such a structure, if common voltages are applied to the electrodes at a time of display of the colored particles and the electrodes are set to the floating state individually at a time of display of the colored layer 6 formed at the rear face plate 2, field strength in a horizontal direction between the plates is made uniform. Thus, display responsiveness can be improved.

[Fourth Embodiment]

Figure 33:
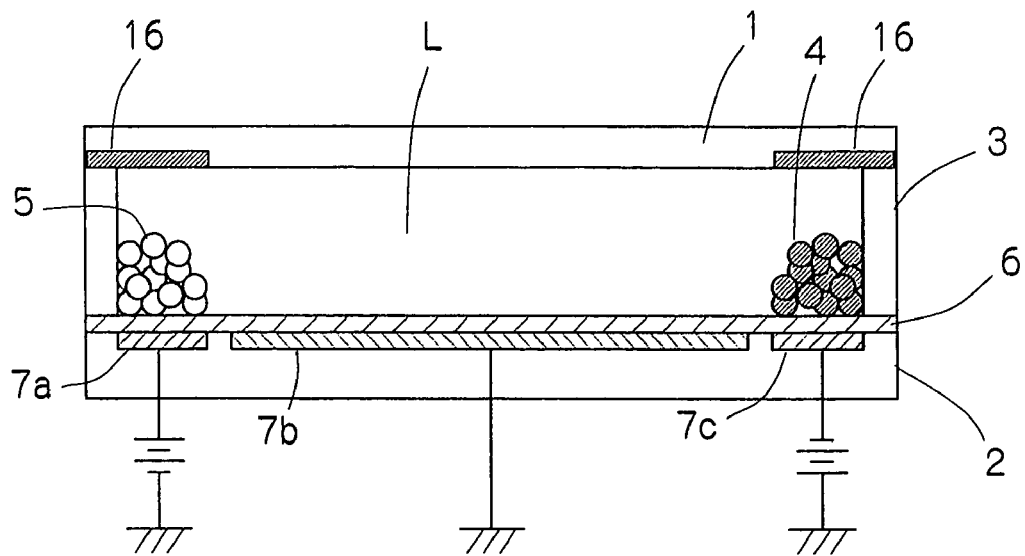
FIG. 33 is a view showing an example in which a shading member 16, such as a black matrix or the like, is formed at portions of the display plate 1 to correspond with locations at which colored particles are clustered.

Next, a fourth embodiment of the present invention will be described with reference to FIGS. 20 to 23, and (a plurality of) variant examples will be described with reference to FIGS. 24 and 33. Note that components that are the same as in the embodiments described above are assigned the same reference numerals, and detailed descriptions thereof are omitted.

Figure 20:
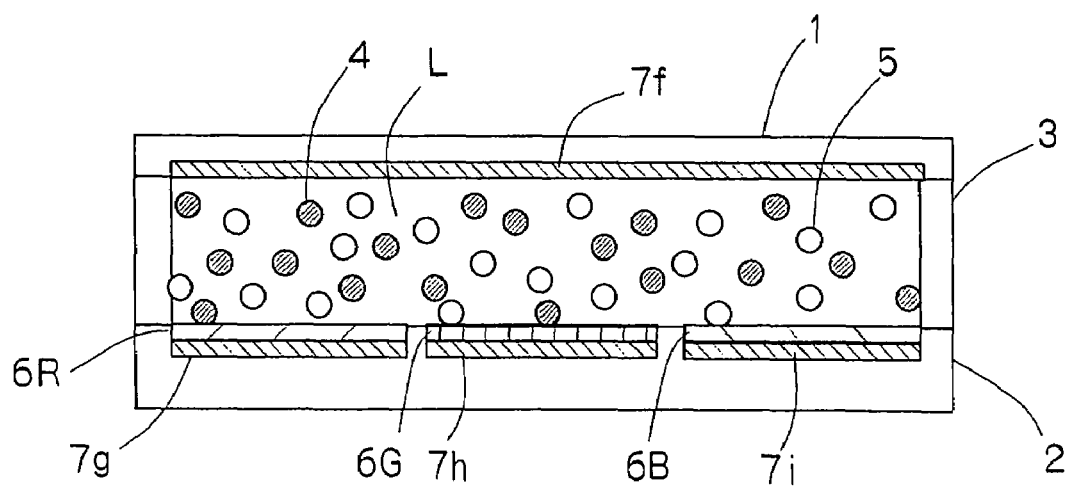
FIG. 20 is a view showing schematic structure of an image display medium of a fourth embodiment of the present invention, which shows an example in which electrodes 7g, 7h and 7i are formed with equal widths at the rear face plate 2, and three colored layers, which are a red layer 6R, a green layer 6G and a blue layer 6B, are formed in correspondence with the electrodes 7g, 7h and 7i.

In an image display medium shown in FIG. 20, the electrodes 7g, 7h and 7i are formed with the same width at the rear face plate 2, and the red layer 6R, green layer 6G and blue layer 6B are formed at the colored layer 6 in correspondence with the electrodes 7g, 7h and 7i. Other structures are the same as the structures illustrated in FIG. 12.

Figure 21:
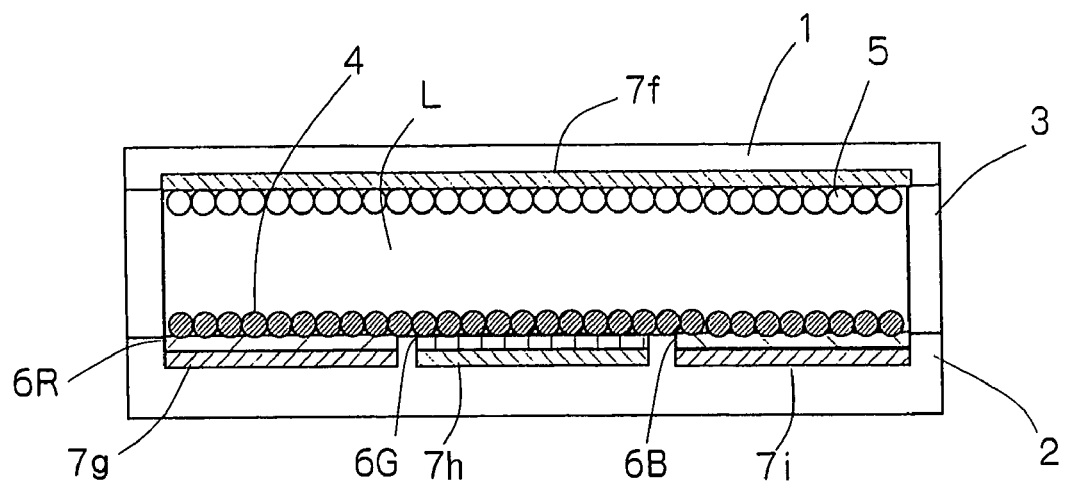
FIG. 21 is a view showing, in the structure of FIG. 20, a state which can display white.
Figure 22:
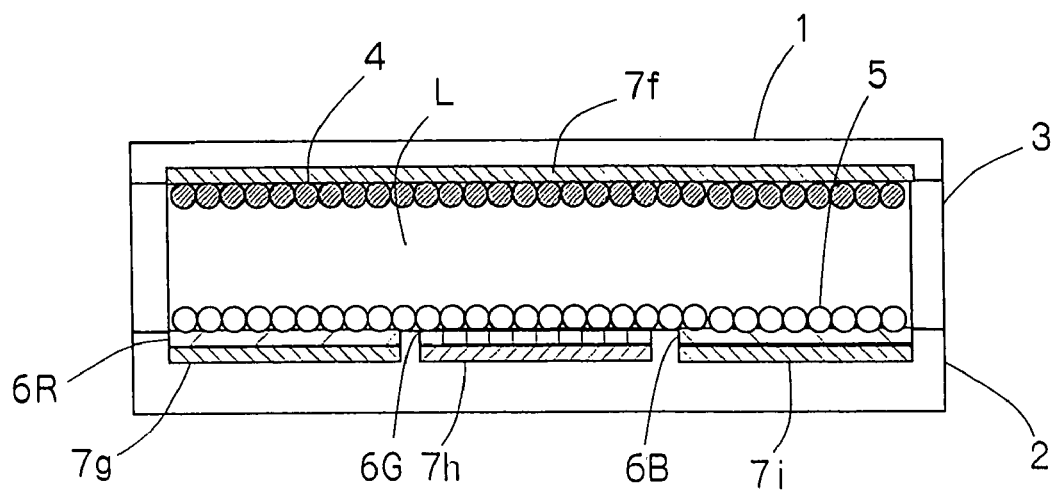
FIG. 22 is a view showing, in the structure of FIG. 20, a state which can display black.
Figure 23:
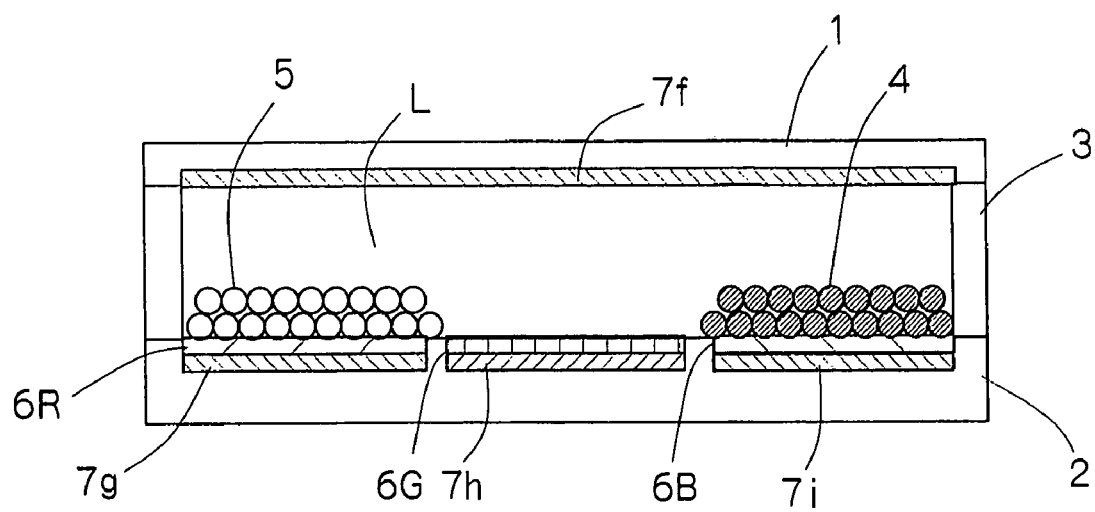
FIG. 23 is a view showing an example, in the structure of FIG. 20, in which the color of the green layer 6G formed at the rear face plate 2 is displayed.

As shown in FIG. 21, if a voltage of +50 V is applied to the electrode 7f of the display plate 1 and −50 V is applied to the electrodes 7g, 7h and 7i of the rear face plate 2, the white particles 5 will be adheringly held at the display plate 1 side, and white display will be achieved. Similarly, as shown in FIG. 22, if a voltage of −50 V is applied to the electrode 7f of the display plate 1 and +50 V is applied to the electrodes 7g, 7h and 7i of the rear face plate 2, the black particles 4 will be adheringly held at the display plate 1 side, and black display will be achieved. Furthermore, if, for example, a voltage of 0 V is applied to the electrode 7f of the display plate 1, +50 V is applied to the electrode 7g of the rear face plate 2, 0 V is applied to the electrode 7h and −50 V is applied to the electrode 7i, as shown in FIG. 23, the black particles 4 will be adheringly held on the electrode 7i and the white particles 5 will be adheringly held on the electrode 7g. Thus, the green layer 6G formed at the rear face plate 2 can be displayed. At such a time, the white particles 5 and black particles 4 are also observed. However, because the white particles 5 and black particles 4 do not have color, the display is a green display. Similarly, red display by the red layer 6R and blue display by the blue layer 6B can be implemented.

Figure 24:
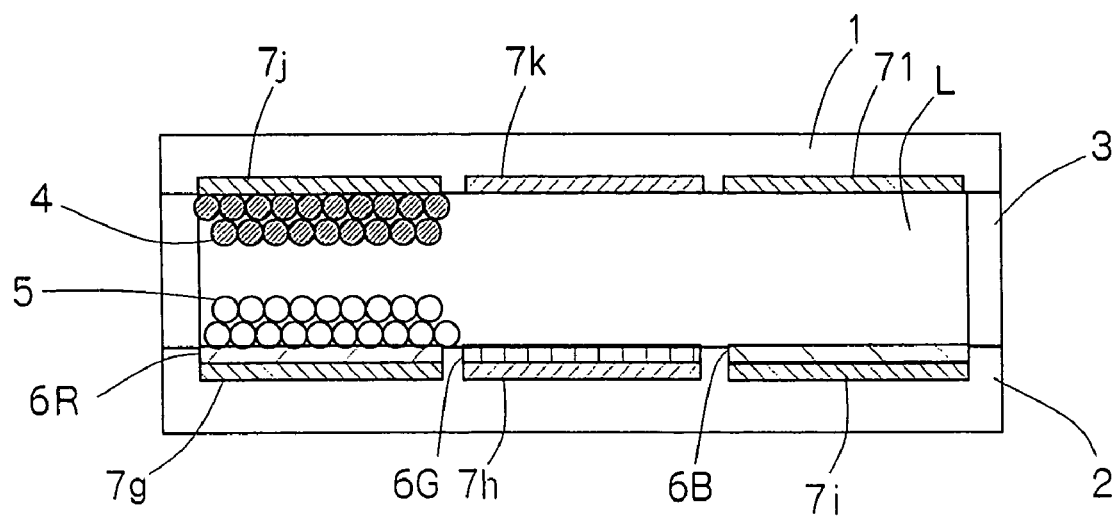
FIG. 24 is a view showing an example, in the structure of FIG. 20, in which the colors of the green layer 6G and the blue layer 6B formed at the rear face plate 2 are displayed, and thus yellow is displayed.

Further, if the electrode 7f of the display plate 1 is divided up as shown in FIG. 24 and electrodes 7j, 7k and 7l are formed so as to correspond with the electrodes 7g, 7h and 7i of the rear face plate 2 and, for example, a voltage of −50 V is applied to the electrode 7j and +50 V is applied to the electrode 7g, then the black particles 4 will be adheringly held on the electrode 7j and the white particles 5 will be adheringly held on the electrode 7g, and the green layer 6G and blue layer 6B will be observed. That is, yellow is displayed. Similarly, by enabling observation of two freely selected colored layers, displays of magenta and cyan are possible.

For the present embodiment, a combination of red, green and blue at the colored layer 6 of the rear face plate 2 has been described. However, a combination of yellow, magenta and cyan may also be employed. Moreover, other combinations of colors may be employed, in accordance with objectives.

Thus, according to the present embodiment, display of three or more colors can be implemented with a single display element, and a more richly expressive multi-color display can be implemented without reducing black-and-white display quality.

Further, although the colored particles do not have a great effect on display color when a color of the colored layer 6 formed at the rear face plate 2 is displayed, because a cluster of the colored particles has a very small area, the colored particles may be sensed as display noise. Accordingly, as shown in FIG. 33, the shading member 16, such as a black matrix or the like, may be formed in the image display medium shown in FIG. 2 at positions corresponding to locations at which the colored particles will cluster. As a result, images can be displayed more sharply.

[Fifth Embodiment]

Next, a fifth embodiment of the present invention will be described with reference to FIGS. 25 to 28. Note that components that are the same as in the embodiments described above are assigned the same reference numerals, and detailed descriptions thereof are omitted.

Figure 26:
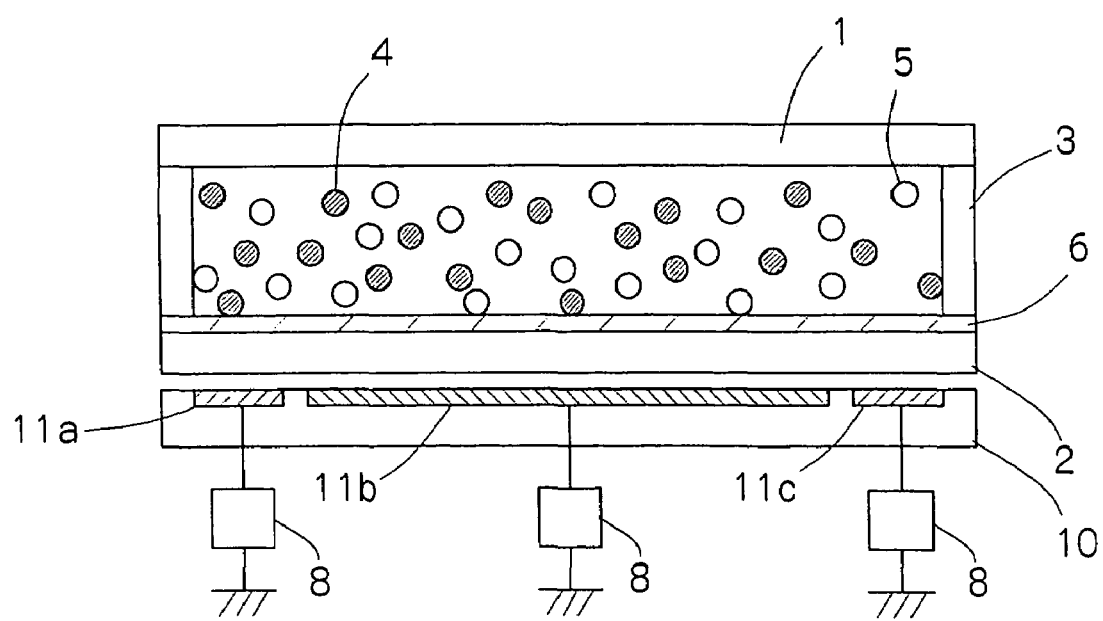
FIG. 26 is a view showing image-writing means, at which an electrode head 10 is brought close to or contacted with the image display medium shown in FIG. 25 and an image is written.

An image display medium ID relating to the present embodiment is of a type in which electrodes are not provided at the display plate 1 and the rear face plate 2. Other structures thereof are similar to the structures illustrated in FIG. 1. Image display is implemented by image-writing means, which is disposed close to or contacting the image display medium ID. In the present embodiment, the electrode head 10 is employed as the image-writing means, as shown in FIG. 26.

Figure 25:
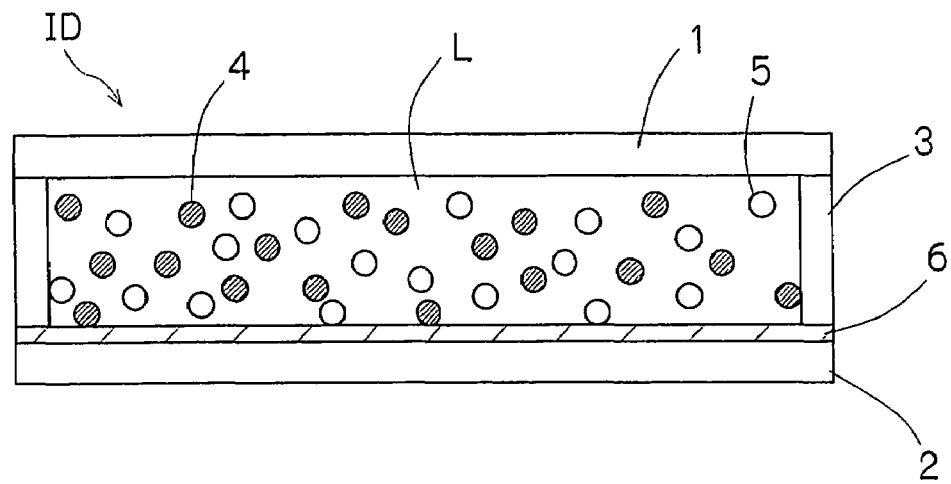
FIG. 25 is a view showing schematic structure of an image display medium of a fifth embodiment of the present invention, which shows a structural example of an image display medium which does not have electrodes at the display plate 1 and the rear face plate 2.
Figure 27A:
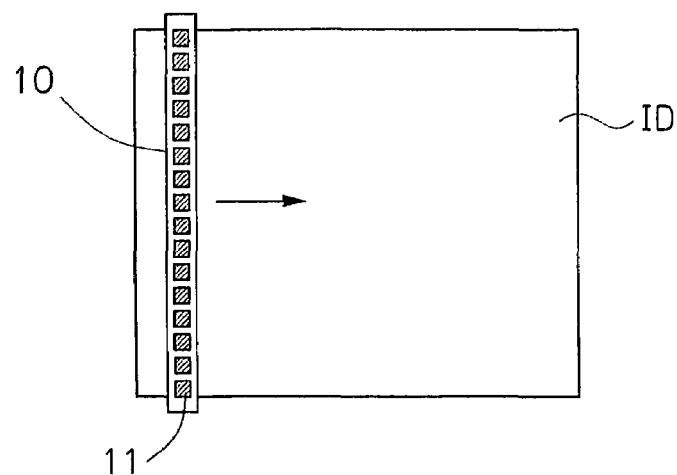
FIGS. 27A and 27B are views showing image-writing means at which the electrode head 10, at which electrodes 11 are arranged in a row, is brought close to or contacted with the image display medium shown in FIG. 25, the whole face of a rear face plate side is scanned, and an image is written.
Figure 27B:
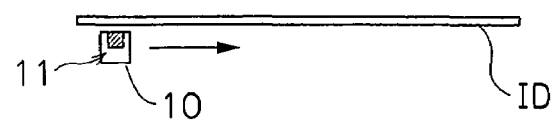
Figure 28:
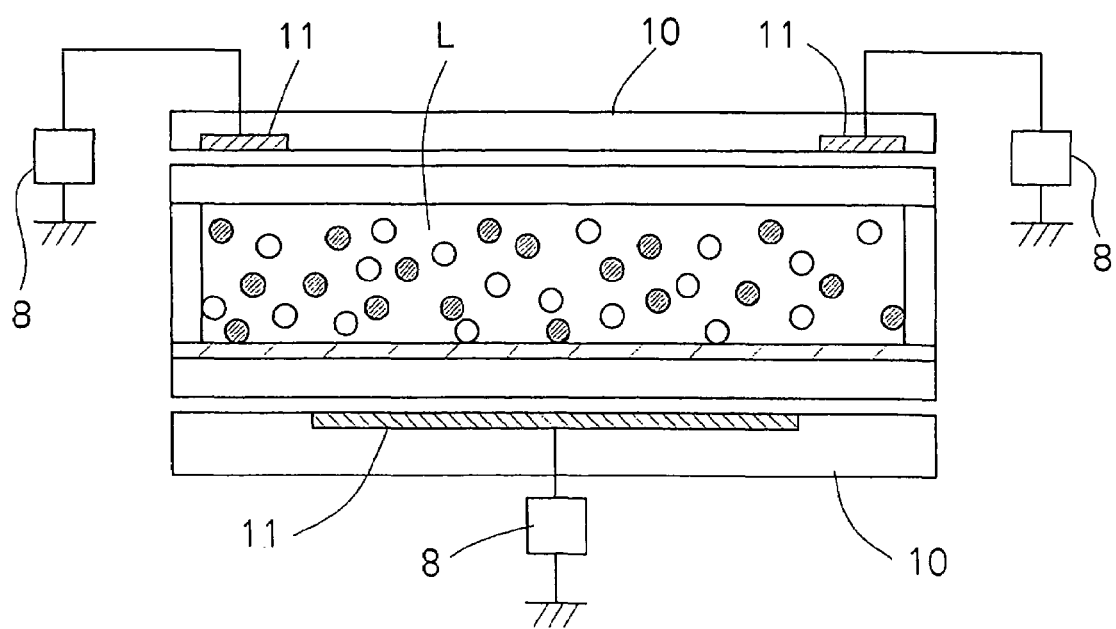
FIG. 28 is a view showing image-writing means at which the electrode heads 10 of FIG. 26 are arranged above and below the image display medium.

The electrode head 10 is equipped with electrodes 11a, 11b and 11c, which apply desired voltages in accordance with image information. Further, in the electrode head 10 that is employed in the present embodiment, the electrodes 11 are arranged in a row, as shown in FIGS. 27A and 27B, and the electrode head 10 scans the whole surface of the rear face plate 2 side of the image display medium ID, which is shown in FIG. 25, while being very closely contacted therewith. Of course, the electrode head 10 may be fixed while the image display medium is moved. Further still, as shown in FIG. 28, the electrode head 10 may be arranged above and below the image display medium.

Besides electrode heads, any structure that is capable of forming desired electric fields between the plates of the image display medium can be employed as the image-writing means. For example, a structure for forming a static charge image at a light-sensitive body may be brought close to or contacted with the image display medium.

Thus, according to the present embodiment, because electrodes are not formed at the image display medium, the image display medium can be formed simply and inexpensively.

[Sixth Embodiment]

Figure 34:
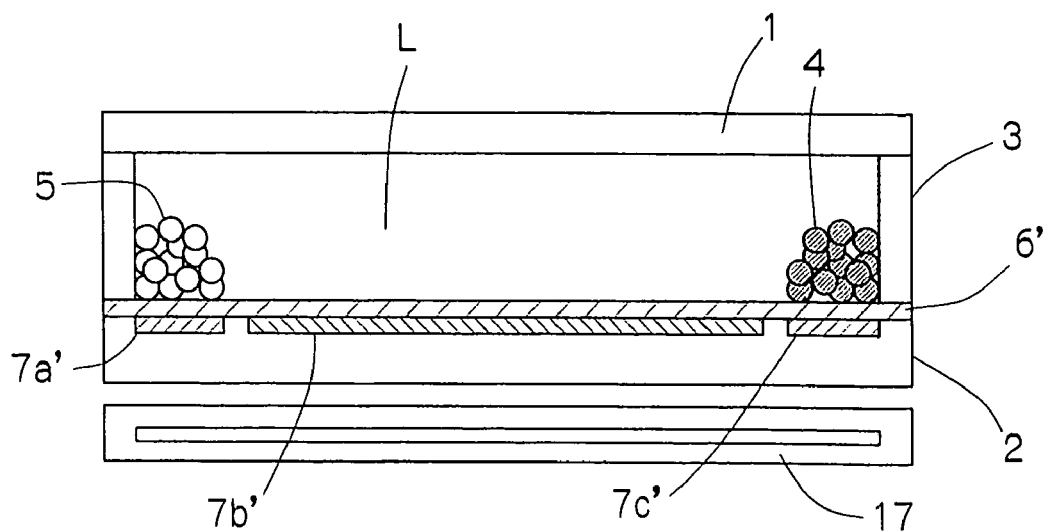
FIG. 34 is a view showing an example in which a backlight is provided, at which backlight a light illumination component 17 is disposed at the rear face plate side of an image display medium.

Next, a sixth embodiment of the present invention will be described with reference to FIGS. 29 to 32, and a variant example will be described with reference to FIGS. 34 and 35. Note that components that are the same as in the embodiments described above are assigned the same reference numerals, and detailed descriptions thereof are omitted.

Figure 29:
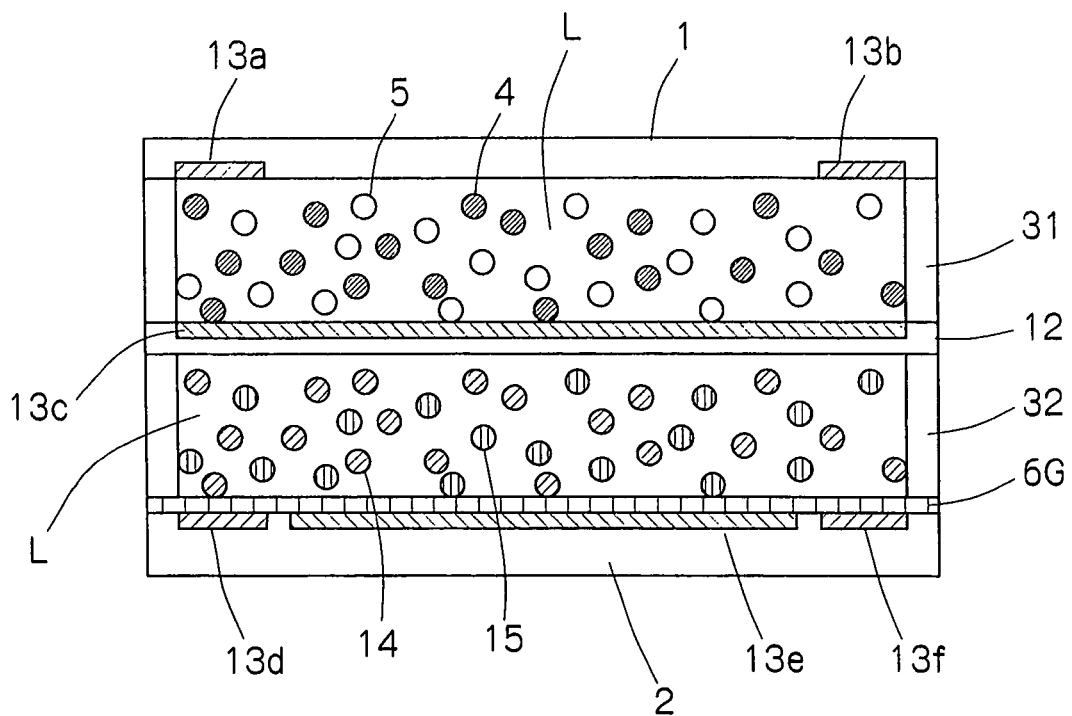
FIG. 29 is a view showing schematic structure of an image display medium of a sixth embodiment of the present invention, which shows a structure in which a two-layer construction is formed by the display plate 1, a transparent intermediate plate 12, which is disposed to oppose the display plate 1, and the rear face plate 2, which is disposed to oppose the intermediate plate 12.

An image display medium of the present embodiment has a two-layer structure formed by the display plate 1, the transparent intermediate plate 12, which is disposed to oppose the display plate 1, and the rear face plate 2, which is disposed to oppose the intermediate plate 12, a spacer member 31 is disposed between the display plate 1 and the intermediate plate 12, and a spacer member 32 is disposed between the intermediate plate 12 and the rear face plate 2. Consequently, each inter-plate separation is maintained, and at the same time, each inter-plate space is divided into a plurality of cells. In the present embodiment, the inter-plate separations are respectively maintained at 50 $\mu$m by the spacer members 31 and 32, and each inter-plate space is structured with cells which are 300 $\mu$m both laterally and longitudinally. Note that, for the sake of explanation and simplification of the drawings, FIG. 29 is a drawing concerned with and showing a single cell.

The transparent dispersion fluid L in which the positively charged black particles 4 and the negatively charged white particles 5 are dispersed is enclosed between the display plate 1 and the intermediate plate 12, and a transparent dispersion fluid L in which positively charged red particles 14 and negatively charged blue particles 15 are dispersed is enclosed between the intermediate plate 12 and the rear face plate 2.

Naturally, colorant particles may be employed as chromatic particles such as the red particles 14 and blue particles 15 or the like. Quinacridone red, cadmium red, lake red or the like may be employed as the red particles 14, and phthalocyanine blue, cobalt blue or the like may be employed as the blue particles 15.

Meanwhile, the green colored layer 6G is formed at the display face side of the rear face plate 2. Furthermore, transparent electrodes 13a and 13b are formed at the display plate 1, a transparent electrode 13c is formed at the intermediate plate 12, and transparent electrodes 13d, 13e and 13f are formed at the rear face plate 2. Voltages are applied in accordance with image information by an unillustrated voltage application system.

First, a driving method for black-and-white display by the black particles 4 and the white particles 5 at a first layer will be described.

Figure 30:
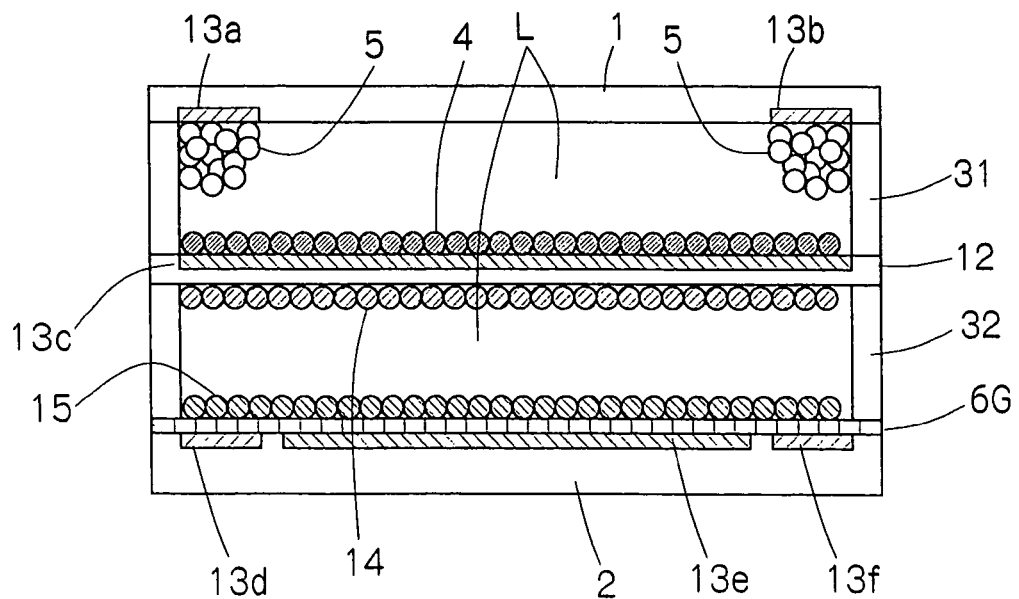
FIG. 30 is a view showing, in the structure of FIG. 29, a state which can display black.

If voltages of +50 V are applied to the electrodes 13a and 13b of the display plate 1 and −50 V is applied to the electrode 13c of the intermediate plate 12, as shown in FIG. 30, the black particles 4 will be moved onto the electrode 13c, and the white particles 5 will be moved onto the electrodes 13a and 13b. Thus, black display is achieved. Then, if voltages of −50 V are applied to the electrodes 13a and 13b of the display plate 1 and +50 V is applied to the electrode 13c of the intermediate plate 12, the white particles 5 will be moved onto the electrode 13c, and the black particles 4 will be moved onto the electrodes 13a and 13b. Thus, white display is achieved. At this time, an arrangement of the colored particles of the second layer does not cover the black particles 4 or white particles 5 of the first layer, and thus does not affect display. Therefore, particular control of the arrangement of the colored particles of the second layer is not required. In FIG. 30, the voltages of +50 V are applied to the electrodes 13a and 13b of the display plate 1, the voltage of −50 V is applied to the electrode 13c of the intermediate plate 12, and 0 V is applied to the electrodes 13d, 13e and 13f of the rear face plate 2. Therefore, the positively charged red particles 14 adhere at the intermediate plate 12 side, and the negatively charged blue particles 15 adhere on the electrodes 13d, 13e and 13f of the rear face plate 2.

Next, a driving method for display by the red particles 14 and blue particles 15 of the second layer will be described.

Figure 31:
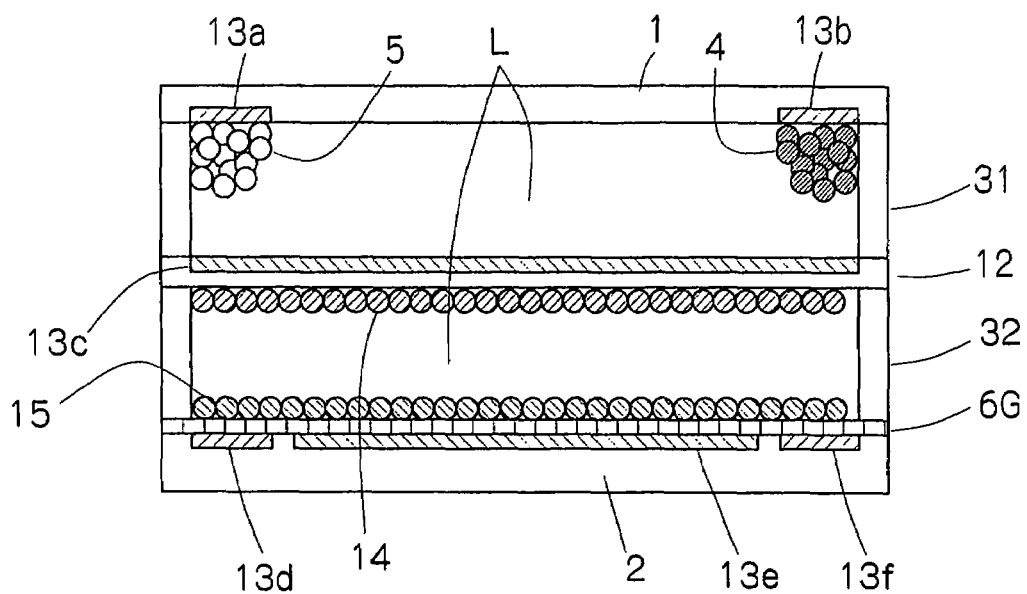
FIG. 31 is a view showing, in the structure of FIG. 29, a state which can display red.

A voltage of +50 V is applied to the electrode 13a of the display plate 1, a voltage of −50 V is applied to the electrode 13b, and a voltage of 0 V is applied to the electrode 13c of the intermediate plate 12. As a result, as shown in FIG. 31, the white particles 5 move to the electrode 13a side and the black particles 4 move to the electrode 13b side. Thus, a state in which the colored particles of the second layer can be observed through the transparent intermediate plate 12 is attained. At this time, if, for example, voltages of +50 V are applied to the electrodes 13d, 13e and 13f of the rear face plate 2, as shown in FIG. 31, the positively charged red particles 14 will adhere to the intermediate plate 12 side and the negatively charged blue particles 15 will adhere on the electrodes 13d, 13e and 13f of the rear face plate 2. Thus, red display by the red particles 14 can be implemented. Further, if voltages of −50 V are applied to the electrodes 13d, 13e and 13f of the rear face plate 2, after this the blue particles 15 will adhere at the electrode 13c face of the intermediate plate 12 and the red particles 14 will adhere at the electrodes 13d, 13e and 13f of the rear face plate 2. Thus, blue display is achieved.

Figure 32:
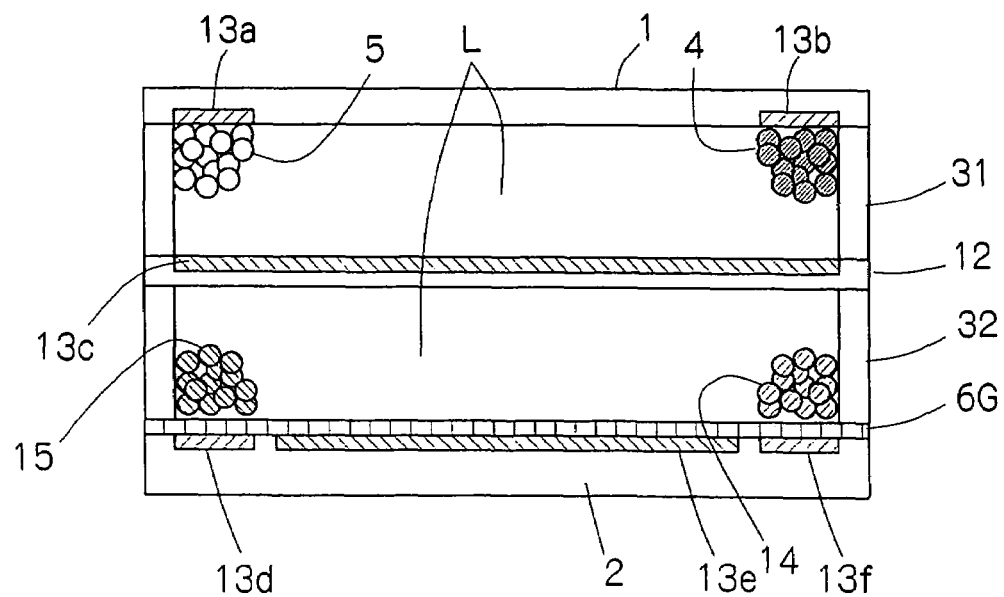
FIG. 32 is a view showing, in the structure of FIG. 29, an example in which the green colored layer 6G formed at the rear face plate 2 is displayed.

Further, if a voltage of +50 V is applied to the electrode 13d of the rear face plate 2 and −50 V is applied to the electrode 13f, the red particles 14 will move onto the electrode 13f and the blue particles 15 will move onto the electrode 13d. Thus, as shown in FIG. 32, the green colored layer 6G formed at the rear face plate 2 can be displayed.

Note that positions of the electrodes formed at the plates, sizes, voltage application processes, colors and combinations of the colored particles, coloring of the colored layer at the rear face plate, and the like are not limited by the present embodiment. Moreover, when there is a plurality of layers, it is not necessarily required that two types of colored particles are disposed at each layer. Furthermore, structures with three or more layers are also possible.

According to an image display medium with a multi-level structure as in the present embodiment, it is possible to implement display of three or more colors with a single display element, and more richly expressive multi-color display can be implemented without reducing black-and-white display quality.

Now, in the image display mediums that have been described above, the rear face plate 2 may have light transmissivity, and structures having light transmissivity can be employed for the electrodes and colored layers that are formed at the rear face plate 2. In such cases, as shown in FIG. 34, for example, the light illumination component 17 can be disposed at the rear face plate side of the image display medium, and light can be illuminated from the rear face plate side. Hence, at a region of a transparent electrode 7b', at which the colored particles are not adhered, red light passes through a red colored layer 6', which has light transmissivity. Thus, red display can be implemented.

Figure 35:
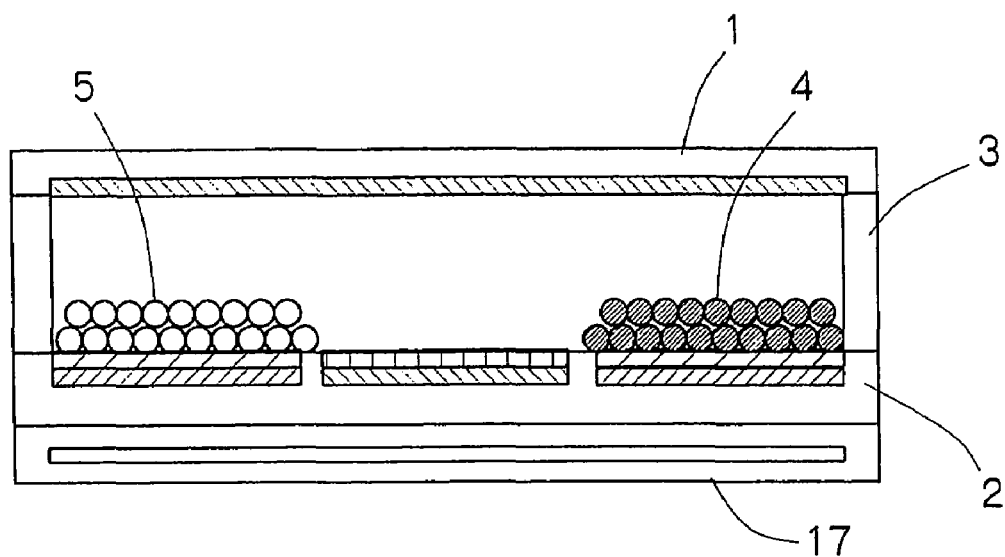
FIG. 35 is a view showing an example in which a backlight is provided, at which backlight the light illumination component 17, which is formed integrally with an image display medium, is disposed at the rear face plate side of the image display medium.

Further, as shown in FIG. 35, the light illumination component 17 may be formed integrally with the image display medium shown in FIG. 23. In the example of FIG. 35, any one of red, green and blue colored layers can be selectively displayed by arbitrarily moving the colored particles.

Here, LEDs, electroluminescent elements, a fluorescent lamp, a combination of a light-emitting body with light-guiding means (a light-emitting sheet), or the like may be employed as the light illumination component 17.

Thus, by structuring the rear face plate, electrodes and colored layers with structures having light transmissivity, a light-transmission type image display medium (a type which emits light from a backlight) can be formed.

Now, the image display mediums described for the above embodiments are mediums in which colored particles are dispersed in a transparent dispersion fluid. However, the present invention is not limited thus. Colored particles with high powder-flowability (particles which have flow characteristics similar to fluids in smoothly flowing states) may be employed. In such a case, the colored particles need not be dispersed in a liquid.

For example, particles that are close to perfect spheres have high powder-flowability. Furthermore, the flowability is raised further if smaller microparticles, whose diameters are not more than a tenth of the above-mentioned particles, are adheringly fixed at the surfaces of the above-mentioned particles to form microscopic indentation and protrusion forms on those surfaces. By enclosing such colored particles with high flowability in cells which are formed by a spacer member between a display plate and a rear face plate, with other structures being similar to the structures described for the above embodiments, it is possible to implement similar displays. In this structure, the cells may be filled with a vacuum, nitrogen or the like.

[Seventh Embodiment]

Next, a seventh embodiment of the present invention will be described with reference to FIGS. 36 to 39. Note that components that are the same as in the embodiments described above are assigned the same reference numerals, and detailed descriptions thereof are omitted.

The image display mediums that have been described above employ colored rear face plates and display three colors in total at a single display element, the colors of the two types of colored particles and the color of the rear face plate. However, for the present embodiment, a case in which the dispersion fluid in which the colored particles are dispersed is colored will be described.

Figure 36:
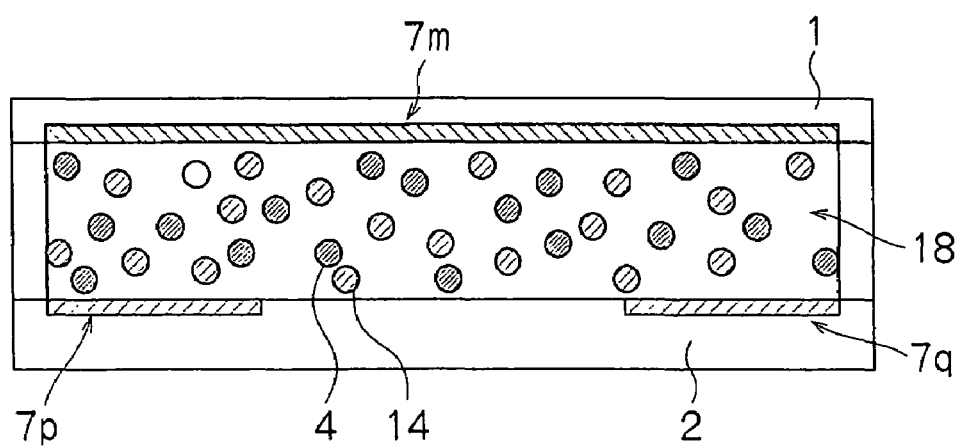
FIG. 36 is a view showing an image display medium relating to a seventh embodiment.

As shown in FIG. 36, in an image display medium relating to the present embodiment, an electrode 7m is formed at the display plate 1 and electrodes 7p and 7q are formed at the rear face plate 2. The cell is filled with a white dispersion fluid 18, in which, for example, the positively charged black particles 4 and the negatively charged red particles 14 are dispersed.

Figure 37:
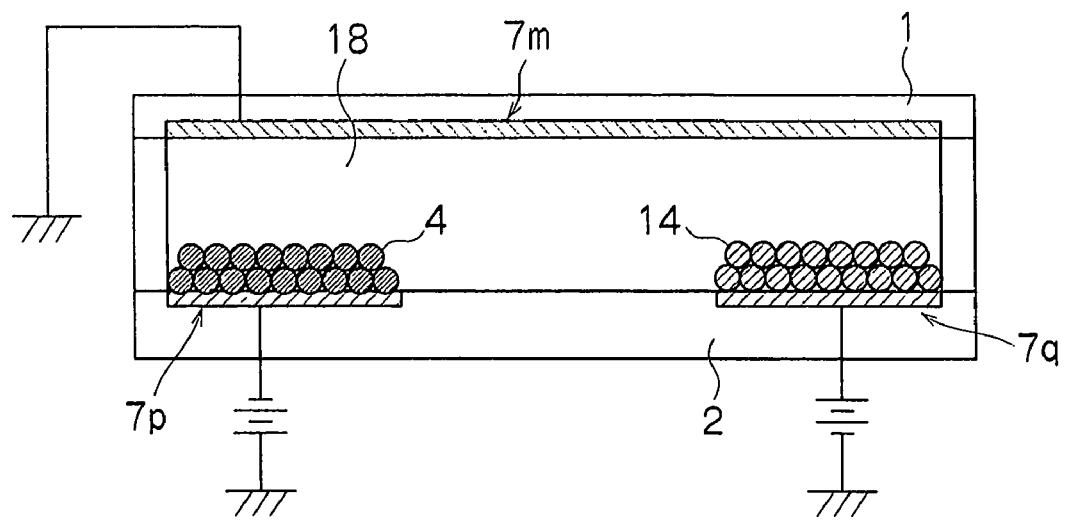
FIG. 37 is a view showing an image display medium relating to a seventh embodiment.

As shown in FIG. 37, if a voltage of 0 V is applied to the electrode 7m of the display plate 1, −50 V is applied to the electrode 7p of the rear face plate 2 and +50 V is applied to the electrode 7q, the black particles 4 will move onto the electrode 7p and the red particles 14 will move onto the electrode 7q. In this state, the white dispersion fluid 18 is observed from the display face side. Thus, white display is achieved.

Figure 38:
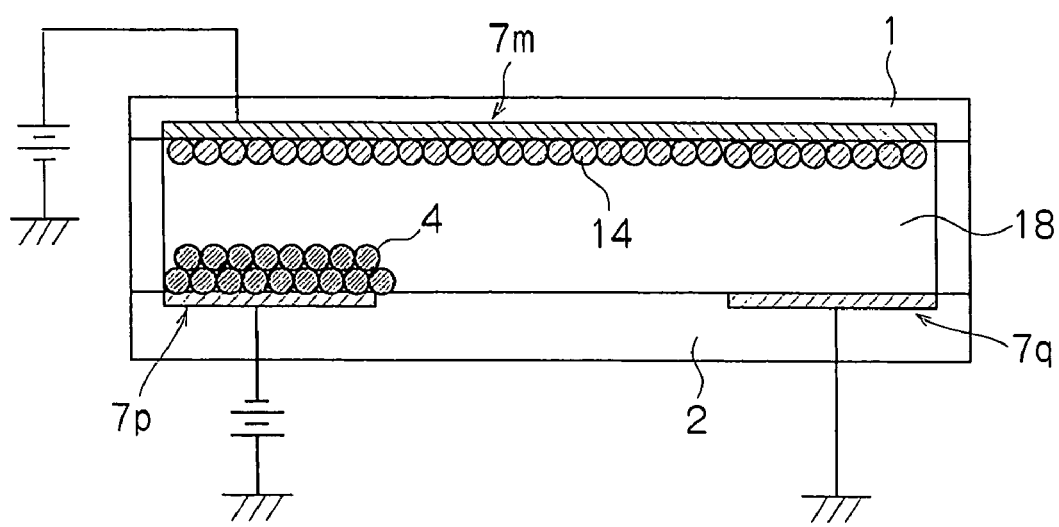
FIG. 38 is a view showing an image display medium relating to a seventh embodiment.

Further, as shown in FIG. 38, if a voltage of +50 V is applied to the electrode 7m of the display plate 1, −50 V is applied to the electrode 7p of the rear face plate 2 and 0 V is applied to the electrode 7q, the black particles 4 will move onto the electrode 7p and the red particles 14 will move onto the electrode 7m. In this state, the red particles 14 are observed from the display face side. Thus, red display is achieved.

Figure 39:
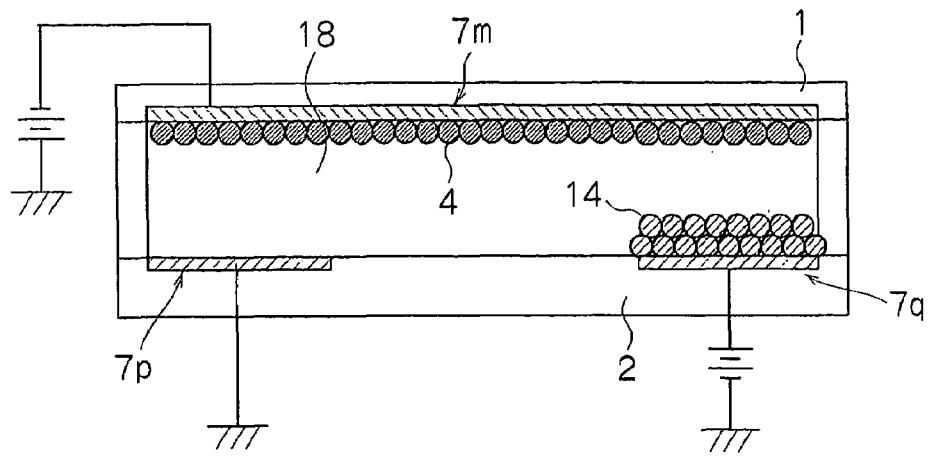
FIG. 39 is a view showing an image display medium relating to a seventh embodiment.
Figure 40A:
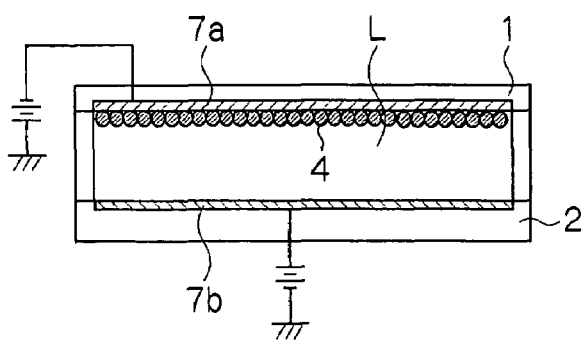
FIG. 40A is a view showing an image display medium relating to a conventional example.
Figure 40B:
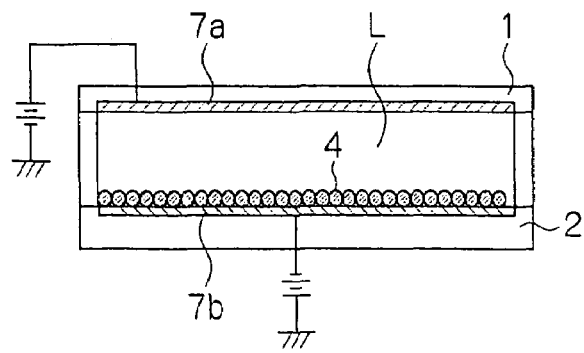
FIG. 40B is a view showing the image display medium relating to the conventional example.
Figure 41A:
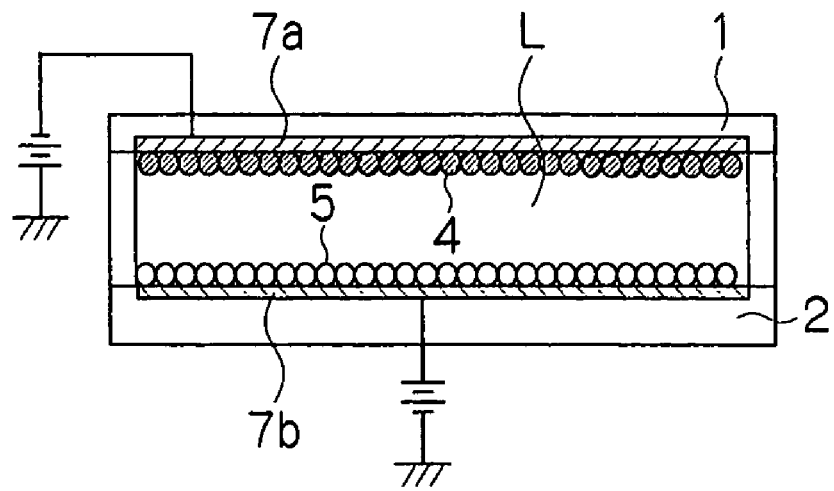
FIG. 41A is a view showing an image display medium relating to another conventional example.
Figure 41B:
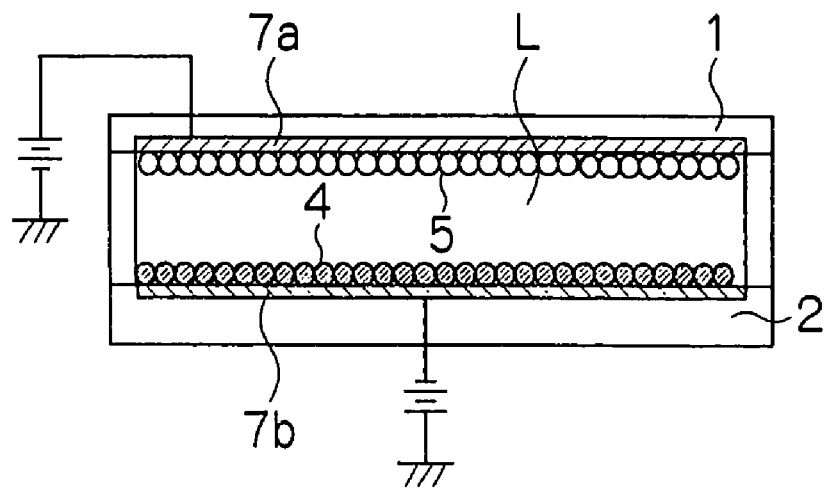
FIG. 41B is a view showing the image display medium relating to the another conventional example.
Figure 42A:
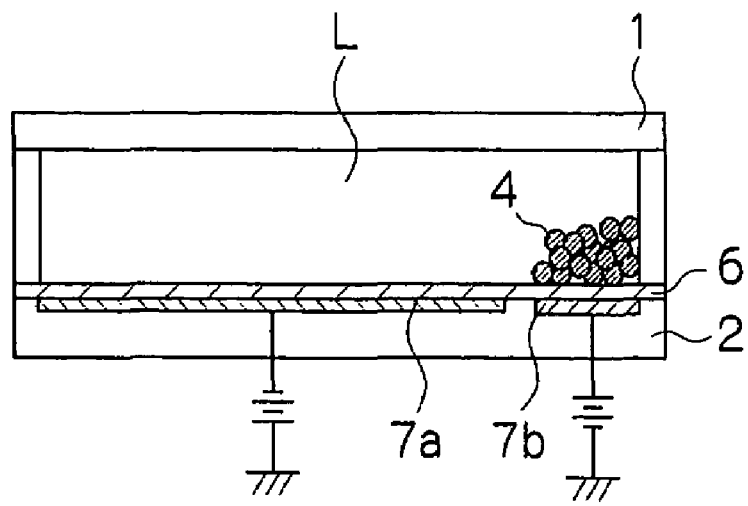
FIG. 42A is a view showing an image display medium relating to yet another conventional example.
Figure 42B:
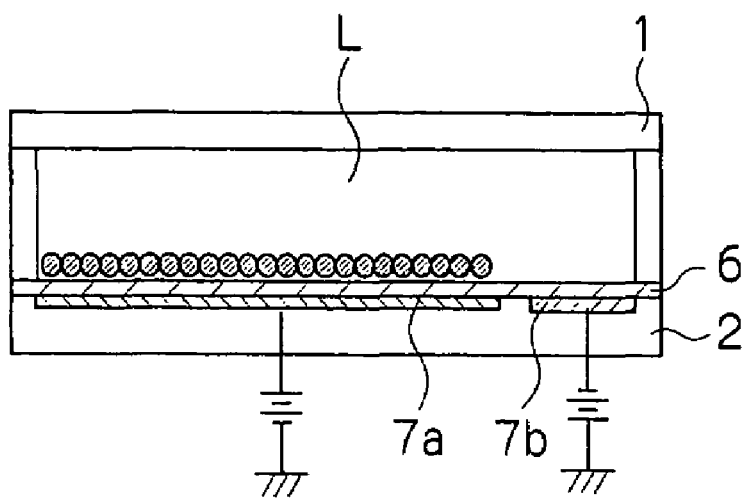
FIG. 42B is a view showing the image display medium relating to the yet another conventional example.

Further yet, as shown in FIG. 39, if a voltage of −50 V is applied to the electrode 7m of the display plate 1, 0 V is applied to the electrode 7p of the rear face plate 2 and +50 V is applied to the electrode 7q, the black particles 4 will move onto the electrode 7m and the red particles 14 will move onto the electrode 7q. In this state, the black particles 4 are observed from the display face side. Thus, black display is achieved.

Thus, in the present embodiment, display of three colors can be implemented by the colors of two types of colored particles and the color of a colored dispersion fluid.

Note that positions and numbers of the electrodes formed at the plates, sizes, voltage application processes, colors and combinations of the colored particles, color of the colored dispersion fluid, and the like are not limited to the structures described for the present embodiment, and can be freely selected in accordance with requirements.

For the first to seventh embodiments described above, structures have been described in which the colored particles dispersed in the dispersion fluid are enclosed between the plates. However, rather than utilizing a dispersion fluid, structures in which only the colored particles are enclosed between the plates are also possible. In such a case, as described for the above embodiments, it is possible to selectively move the colored particles to the display plate side and/or the rear face plate side and to selectively cluster the colored particles at a portion of the display plate side and/or the rear face plate side simply by applying D.C. voltages.

As has been explained above, excellent effects are provided by the present invention in that colors that are to be displayed can be displayed with appropriate densities, particularly densities of white display and black display, and multi-color display can be realized.

What is claimed is:

1. An image display medium comprising:
    a display plate including light transmissivity;
    a colored rear face plate which is disposed to oppose the display plate and provides first display color;
    a substantially transparent dispersion fluid which is disposed between the plates; and
    at least two kinds of colored particles which provide a second display color and a third display color, respectively, which are contained in the dispersion fluid, can move in accordance with an electric field formed between the plates to display at least one of the first, second and third display colors, and include different electrostatic characteristics and optical characteristics from one another.

2. The image display medium of claim 1, further comprising a plurality of cells formed between the plates, wherein the dispersion fluid containing the colored particles is enclosed in the cells in predetermined amounts.

3. The image display medium of claim 1, further comprising a plurality of electrodes for forming the electric field, which are disposed at least one of the display plate and the rear face plate.

4. The image display medium of claim 1, further comprising a plurality of capsules disposed between the plates, wherein the dispersion fluid containing the colored particles is enclosed in the capsules in predetermined amounts.

5. The image display medium of claim 1, wherein the rear face plate comprises a layer which is colored each of red, green and blue.

6. The image display medium of claim 1, wherein the rear face plate comprises a layer which is colored each of cyan, magenta and yellow.

7. An image display medium comprising:
a display plate including light transmissivity;
a rear face plate which is disposed to oppose the display plate;
an intermediate plate including light transmissivity, which is disposed between the display plate and the rear face plate;
a first dispersion fluid disposed between the display plate and the intermediate plate;
a second dispersion fluid disposed between the intermediate plate and the rear face plate;
at least two kinds of colored particles, which are contained in the first dispersion fluid, can move in accordance with an electric field, and include different electrostatic characteristics and optical characteristics from one another; and
at least two other kinds of colored particles, which are contained in the second dispersion fluid, can move in accordance with an electric field, include different electrostatic characteristics and optical characteristics from one another, and differ from the colored particles in the first dispersion fluid.

8. The image display medium of claim 7, further comprising:
a plurality of first cells formed between the display plate and the intermediate plate; and
a plurality of second cells formed between the intermediate plate and the rear face plate, wherein
the first dispersion fluid containing the colored particles is enclosed in the first cells in predetermined amounts, and
the second dispersion fluid containing the other colored particles is enclosed in the second cells in predetermined amounts.

9. The image display medium of claim 7, further comprising at least one electrode at each of the display plate, the intermediate plate and the rear face plate.

10. An image display medium comprising:
a display plate including light transmissivity;
a rear face plate which is disposed to oppose the display plate;
a colored dispersion fluid which is disposed between the plates and provides a first display color; and
at least two kinds of colored particles which provide a second display color and a third display color, respectively, which are contained in the dispersion fluid, can move in accordance with an electric field formed between the plates to display at least one of the first, second and third display colors, and include different electrostatic characteristics and optical characteristics from one another.

11. The image display medium of claim 10, further comprising a plurality of cells formed between the plates, wherein the dispersion fluid containing the colored particles is enclosed in the cells in predetermined amounts.

12. The image display medium of claim 10, further comprising a plurality of electrodes for forming the electric field, which are disposed at at least one of the display plate and the rear face plate.

13. An image display device comprising
(a) an image display medium including: a display plate including light transmissivity; a colored rear face plate which is disposed to oppose the display plate and provides a first display color; a substantially transparent dispersion fluid which is disposed between the plates which provide a second display color and a third display color, respectively; at least two kinds of colored particles, which are contained in the dispersion fluid, can move in accordance with an electric field formed between the plates to display at least one of the first, second third display colors, and include different electrostatic characteristics and optical characteristics from one another; and a plurality of electrodes for forming the electric field, which are disposed at at least one of the display plate and the rear face plate, and
(b) a voltage application apparatus which applies voltages to the electrodes in accordance with image information.

14. An image display device comprising
(a) an image display medium including: a display plate including light transmissivity; a colored rear face plate which is disposed to oppose the display plate and provides a first display color; a substantially transparent dispersion fluid which is disposed between the plates; and at least two kinds of colored particles which provide a second display color and a third display color, respectively, which are contained in the dispersion fluid, can move in accordance with an electric field formed between the plates to display at least one of the first, second and third display color, and include different electrostatic characteristics and optical characteristics from one another,
(b) a plurality of electrodes for forming the electric field, which are disposed at at least one of the display plate and the rear face plate, and
(c) a voltage application apparatus which applies voltages to the electrodes in accordance with image information.

15. An image display method for an image display medium,
which image display medium includes:
a display plate including light transmissivity;
a colored rear face plate which is disposed to oppose the display plate;
a substantially transparent dispersion fluid which is disposed between the plates; and
at least two kinds of colored particles, which are contained in the dispersion fluid, can move in accordance with an electric field formed between the plates, and include different electrostatic characteristics and optical characteristics from one another,
the image display method comprising the steps of:
of the colored particles, adhering selected particles all across at least one of the display plate and the rear face plate, and clustering the other colored particles at a location at which the other colored particles substantially do not hinder image display; and
clustering all of the colored particles at locations at which the colored particles substantially do not hinder image display.

16. An image display method for an image display medium,
which image display medium includes:
a display plate including light transmissivity;
a colored rear face plate which is disposed to oppose the display plate;
at least two kinds of colored particles, which can move between the plates in accordance with an electric field formed between the plates and which include different electrostatic characteristics and optical characteristics from one another;

a plurality of cells formed between the plates, a dispersion fluid containing the colored particles being enclosed in the cells in predetermined amounts; and at least three electrodes for forming the electric field, which are disposed at at least one of the display plate and the rear face plate, each of the cells having at least three of the electrodes exclusively allocated thereto, and D.C. voltages being applicable to the at least three electrodes mutually independently, the image display method comprising the steps of:

of the colored particles in at least one of the cells, adhering a selected one kind of the colored particles all across at least one of the display plate and the rear face plate, and clustering the other colored particles at a location at which the other colored particles substantially do not hinder image display; and clustering all of the colored particles in the at least one cell at locations at which the other colored particles substantially do not hinder image display.

* * * * *